(12) United States Patent
Mossberg et al.

(10) Patent No.: US 8,314,989 B1
(45) Date of Patent: Nov. 20, 2012

(54) DECORATIVE, ORNAMENTAL, OR JEWELRY ARTICLES HAVING ARRAYS OF DIFFRACTION GRATINGS

(75) Inventors: Thomas W. Mossberg, Eugene, OR (US); Christoph M. Greiner, Eugene, OR (US); Dmitri Iazikov, Eugene, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 795 days.

(21) Appl. No.: 11/967,181

(22) Filed: Dec. 29, 2007

Related U.S. Application Data

(60) Provisional application No. 60/918,383, filed on Mar. 16, 2007, provisional application No. 60/877,901, filed on Dec. 29, 2006.

(51) Int. Cl.
*G02B 5/18* (2006.01)
(52) U.S. Cl. .......................... 359/567; 63/32
(58) Field of Classification Search ............ 359/566, 359/567; 63/32
See application file for complete search history.

(56) References Cited

U.S. PATENT DOCUMENTS

| | | | | |
|---|---|---|---|---|
| 3,516,730 A | * | 6/1970 | Wood | 359/567 |
| 4,490,440 A | * | 12/1984 | Reber | 428/620 |
| 4,604,329 A | * | 8/1986 | Reber | 428/620 |
| 4,725,511 A | * | 2/1988 | Reber | 428/620 |
| 4,737,448 A | * | 4/1988 | Hochberg | 430/321 |
| 4,788,116 A | * | 11/1988 | Hochberg | 430/21 |
| 5,396,839 A | * | 3/1995 | Rice | 101/32 |
| 5,555,800 A | * | 9/1996 | Rice | 101/23 |
| 5,612,102 A | * | 3/1997 | Nakama | 428/15 |
| 5,797,632 A | * | 8/1998 | Rice | 283/114 |
| 6,197,428 B1 | * | 3/2001 | Rogers | 428/446 |
| 6,713,842 B1 | | 3/2004 | Manchester | |
| 7,140,199 B2 | * | 11/2006 | Behr | 63/27 |
| 2007/0157667 A1 | | 7/2007 | Maltezos et al. | |

OTHER PUBLICATIONS

Co-owned U.S. Appl. No. 12/175,459, filed Jul. 18, 2008.
Co-owned U.S. Appl. No. 12/271,683, filed Nov. 14, 2008, Mossberg et al.

* cited by examiner

*Primary Examiner* — Arnel C Lavarias
(74) *Attorney, Agent, or Firm* — David S. Alavi

(57) ABSTRACT

A flat substrate bears a set of flat, coplanar diffraction gratings; a jewelry mounting is secured to the substrate. The gratings are arranged to occupy corresponding areas of the substrate that are arranged to correspond to a two-dimensional projection of multiple, non-coplanar facets of a three-dimensional gemstone. Each grating differs from one or more other gratings with respect to grating wavevector direction so that each grating differs from at least one other grating with respect to direction of dispersion of spectrally dispersed output directions of a diffracted portion of light incident on the gratings along a given input direction. The grating wavevectors are spatially distributed among the corresponding gratings to form two or more subsets of three or more gratings along which subsets the corresponding grating wavevector direction of each grating of the subset varies monotonically with position of that grating along a given dimension of the substrate.

17 Claims, 17 Drawing Sheets

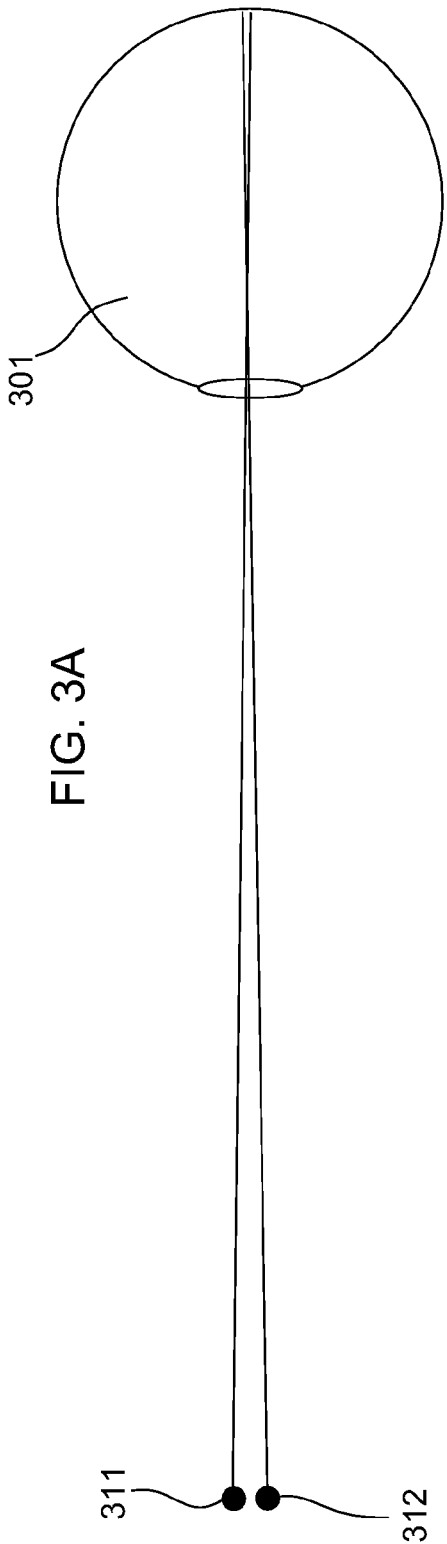
FIG. 3A
FIG. 3B
FIG. 3C

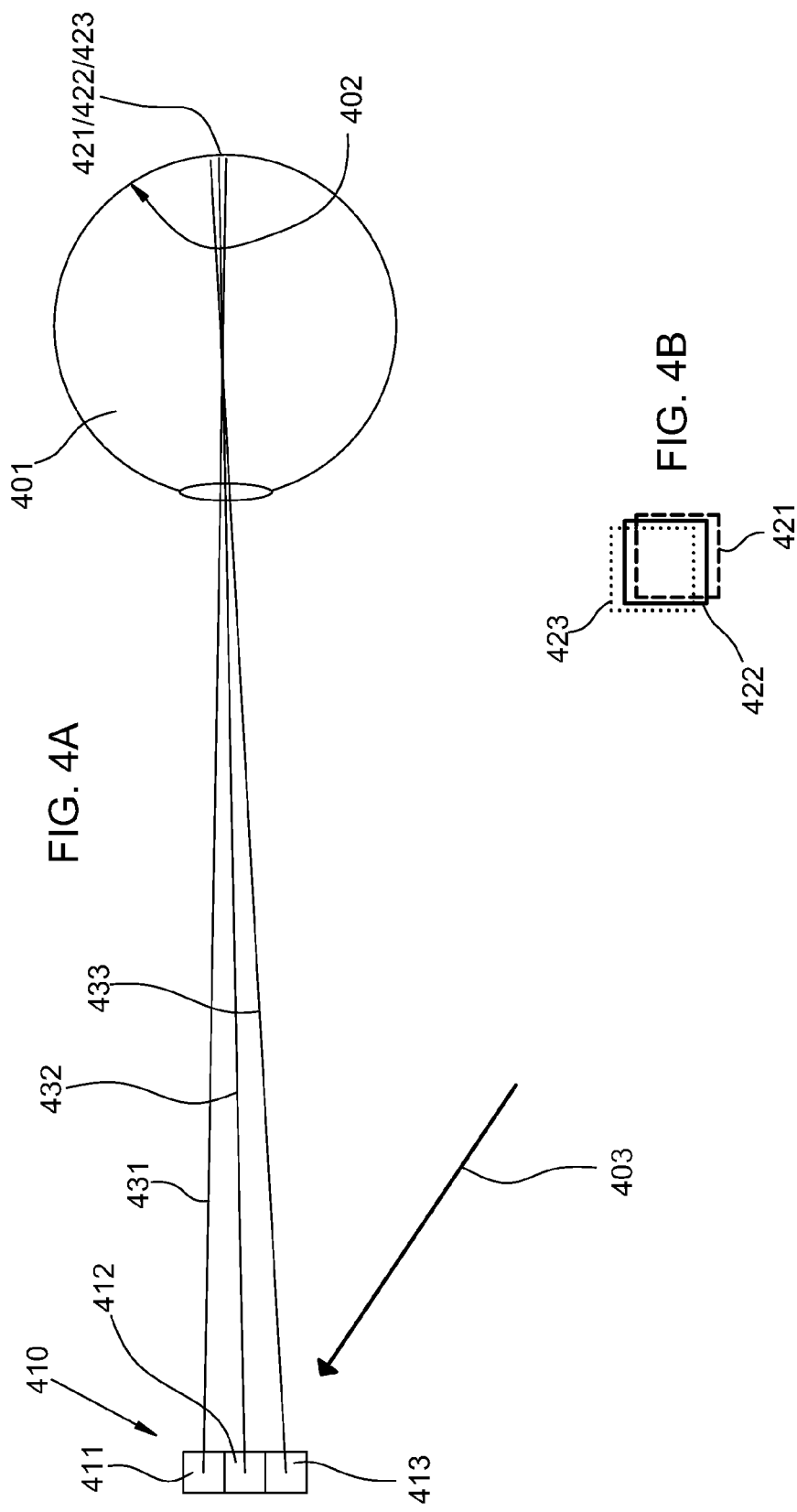

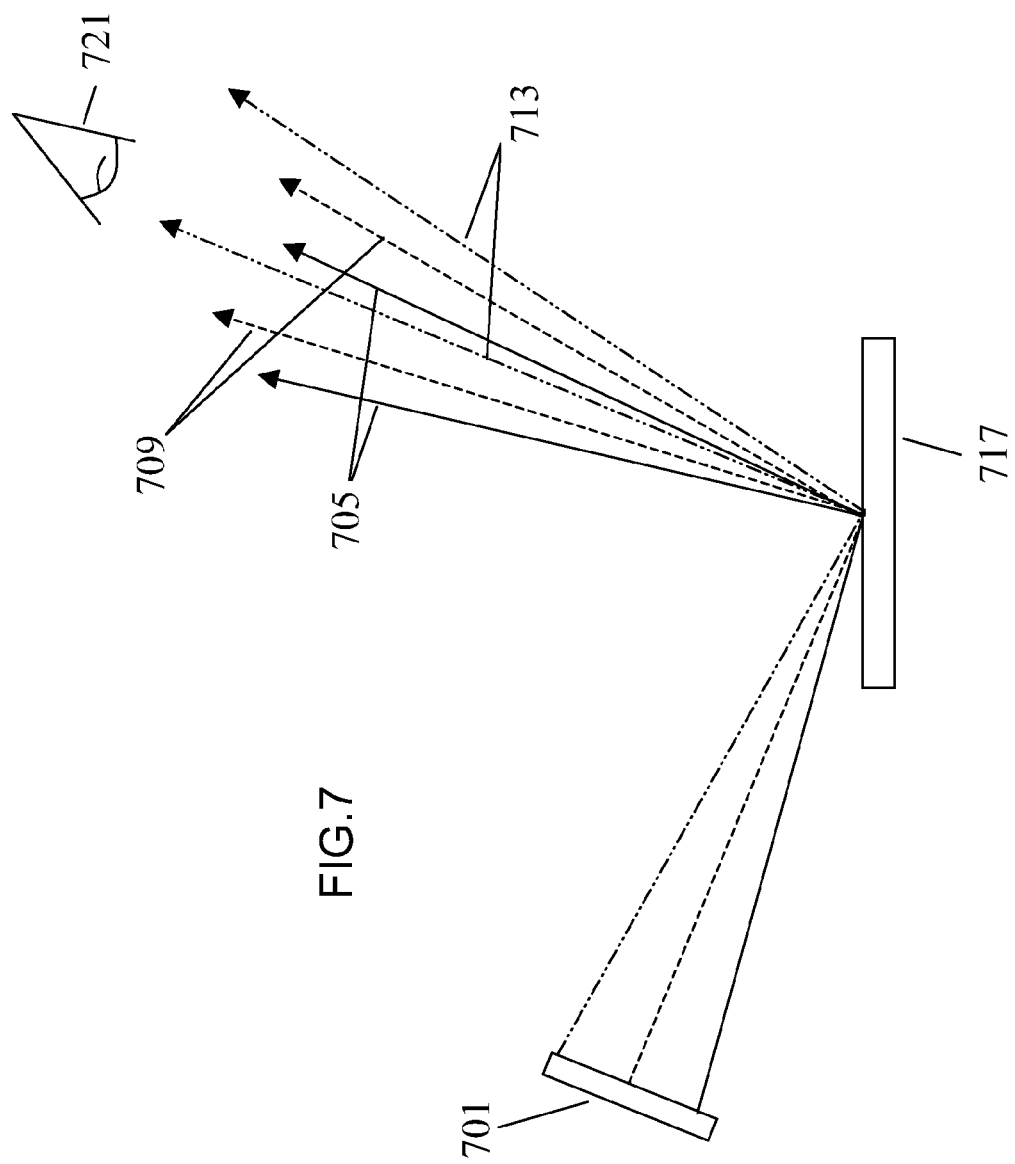

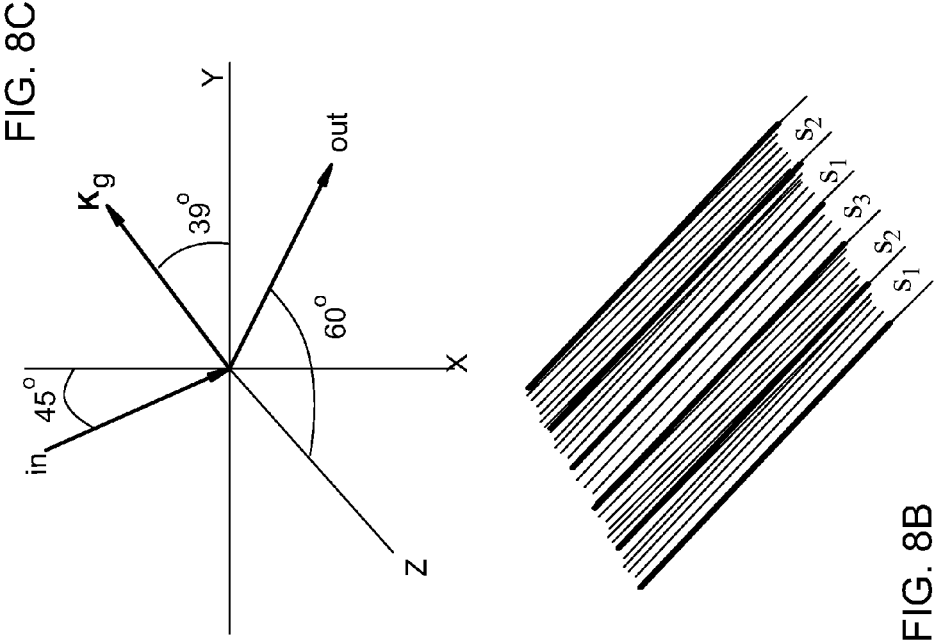
FIG. 8C
FIG. 8B
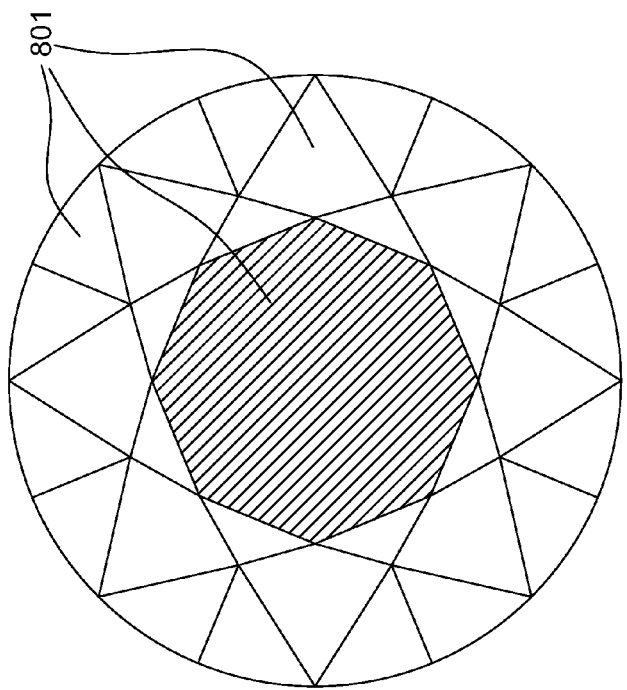
FIG. 8A

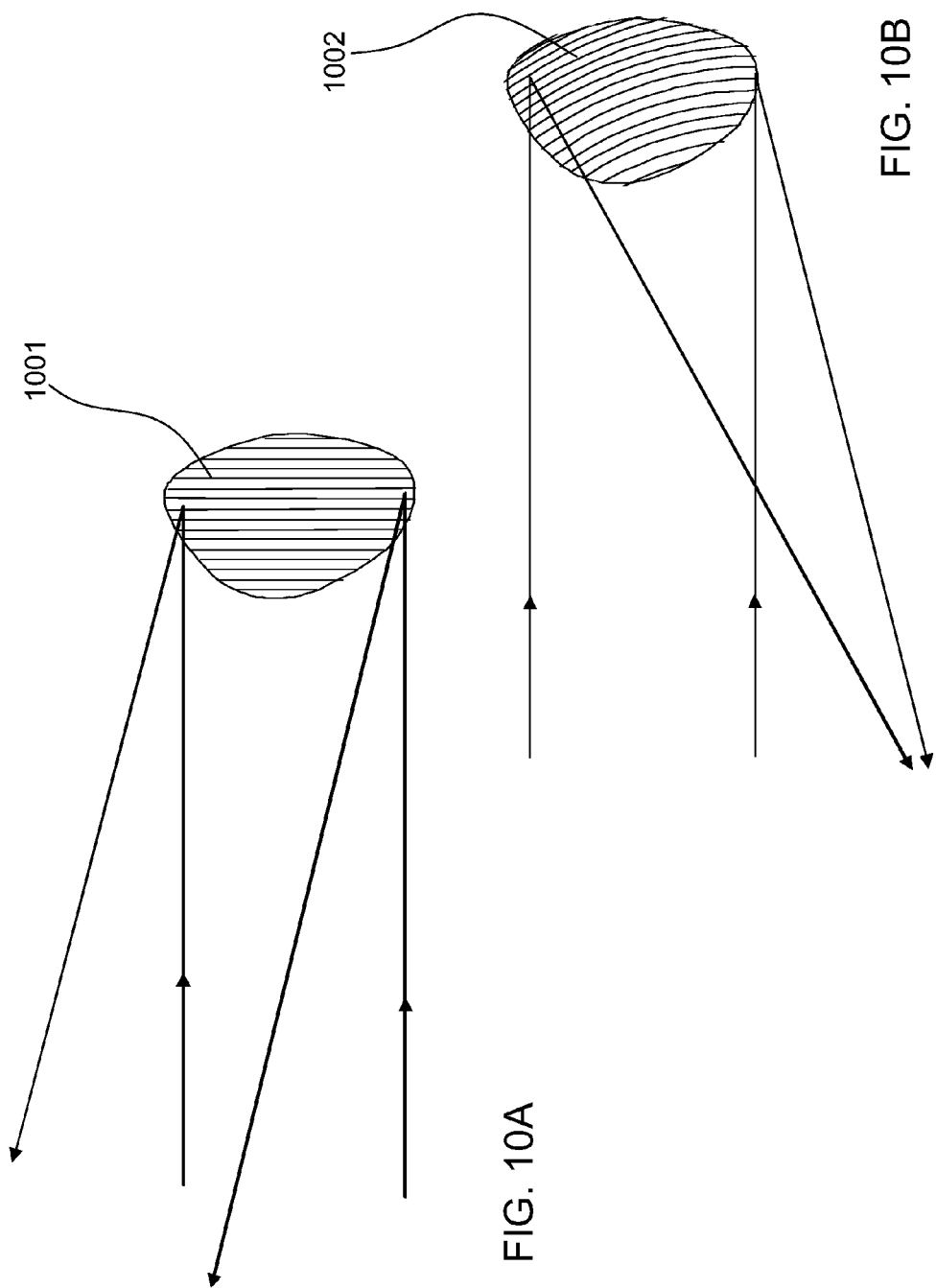

| facet | wavevector µm⁻¹ | angle |
|---|---|---|
| 1 | 0.8 | 0 |
| 1' | 0.3 | 90 |
| 2 | 0.9 | 5 |
| 3 | 1.0 | 8 |
| 4 | 1.0 | 8 |
| 5 | 0.9 | 5 |
| 6 | 0.9 | -5 |
| 7 | 1.0 | -8 |
| 8 | 1.0 | -8 |
| 9 | 0.9 | -5 |
| 10 | 1.0 | -30 |
| 11 | 0.7 | -35 |
| 12 | 1.0 | -30 |
| 13 | 0.7 | 15 |
| 14 | 1.0 | 30 |
| 15 | 0.7 | 35 |
| 16 | 1.0 | 30 |
| 17 | 0.7 | 15 |
| 18 | 1.0 | -20 |
| 19 | 0.7 | -25 |
| 20 | 0.9 | -38 |
| 21 | 1.0 | -43 |
| 22 | 1.0 | 50 |
| 23 | 0.9 | -38 |
| 24 | 0.7 | -25 |
| 25 | 1.0 | -20 |
| 26 | 1.0 | 20 |
| 27 | 0.7 | 25 |
| 28 | 0.9 | 38 |
| 29 | 1.0 | 43 |
| 30 | 1.0 | -50 |
| 31 | 0.9 | 38 |
| 32 | 0.7 | 25 |
| 33 | 1.0 | 20 |

FIG. 13

DECORATIVE, ORNAMENTAL, OR JEWELRY ARTICLES HAVING ARRAYS OF DIFFRACTION GRATINGS

BENEFIT CLAIMS TO RELATED APPLICATIONS

This application claims benefit of U.S. provisional App. No. 60/877,901 filed Dec. 29, 2006 and U.S. provisional App. No. 60/918,383 filed Mar. 16, 2007, both of said provisional applications being hereby incorporated by reference as if fully set forth herein.

BACKGROUND

The field of the present invention relates to jewelry and other decorative or ornamental articles. In particular, jewelry and other decorative or ornamental articles are disclosed herein that have arrays of diffraction gratings.

A variety of decorative or ornamental articles, including jewelry items, have been described that include one or more diffraction gratings. Some of these are described in:

U.S. Pat. No. 4,490,440 entitled "High technology jewelry and fabrication of same" issued Dec. 25, 1984 to Reber;

U.S. Pat. No. 4,604,329 entitled "High technology decorative materials and fabrication of same" issued Aug. 5, 1986 to Reber;

U.S. Pat. No. 4,725,511 entitled "High technology decorative materials for watchfaces and fabrication of same" issued Feb. 16, 1988 to Reber;

U.S. Pat. No. 5,612,102 entitled "Faceted jewelry ornament with facet grooved for light diffraction" issued Mar. 18, 1997 to Nakama;

U.S. Pat. No. 6,713,842 entitled "Mask for and method of forming a character on a substrate" issued Mar. 30, 2004 to Manchester; and U.S. Pub. No. 2007/0157667 A1 entitled "Enhancing the optical characteristics of a gemstone" published Jul. 12, 2007 in the name of Maltezos et al.

None of those references discloses jewelry or other decorative or ornamental articles having arrays of diffraction gratings, one or more of which is arranged to diffract, at one or more designed diffraction angles, substantially white light or light having a desired color composition. None of those references discloses jewelry or other decorative or ornamental articles having arrays of diffraction gratings, one or more of which is arranged to focus light it diffracts. None of those references discloses jewelry or other decorative or ornamental articles wherein light from a moving source is diffracted from a designed succession of gratings of the array that are arranged on a substantially planar surface of an article, e.g., so as to simulate the appearance of a three-dimensional faceted article illuminated by the moving light source or to provide a dynamically pleasing appearance. None of those references discloses jewelry or other decorative or ornamental articles wherein diffracted light intensity varies among gratings of the array that are arranged on a substantially planar surface of an article, e.g., so as to simulate the appearance of a three-dimensional article illuminated by a light source. None of those references discloses jewelry or other decorative or ornamental articles wherein light is scattered from boundary regions between gratings of the array.

It may be desirable to provide jewelry or other decorative or ornamental articles having arrays of diffraction gratings that exhibit one or more of the aforementioned characteristics.

SUMMARY

An article comprises (i) a substantially flat substrate bearing a set of substantially flat, substantially coplanar diffraction gratings, and (ii) a jewelry mounting secured to the substrate. The gratings of the set are arranged so as to occupy corresponding areas of the substrate that are arranged to correspond to a two-dimensional projection of multiple, non-coplanar facets of a three-dimensional faceted gemstone. Each grating of the set differs from one or more other gratings of the set with respect to a corresponding grating wavevector direction so that each grating of the set differs from at least one other grating of the set with respect to a corresponding direction of dispersion of spectrally dispersed output directions of a diffracted portion of input light incident on the gratings along a given input direction. The grating wavevectors are spatially distributed among the corresponding gratings of the set so as to form two or more subsets of three or more gratings of the set along which subsets the corresponding grating wavevector direction of each grating of the subset varies monotonically with position of that grating along a given dimension of the substrate.

Objects and advantages pertaining to jewelry or other decorative or ornamental articles having arrays of diffraction gratings may become apparent upon referring to the exemplary embodiments illustrated in the drawings and disclosed in the following written description or appended claims.

BRIEF DESCRIPTION OF THE DRAWINGS

FIGS. 3A-3C illustrate schematically two objects forming corresponding images on a viewers retina.

FIGS. 4A and 4B illustrate schematically an exemplary array of gratings forming corresponding images on a viewers retina.

FIG. 7 illustrates schematically an exemplary grating diffracting light from an extended source.

FIGS. 8A-8C illustrate schematically an exemplary array of gratings arranged to resemble a faceted gemstone.

FIGS. 10A and 10B illustrate schematically an exemplary diffraction grating arranged to focus light that it diffracts.

Figure 1:
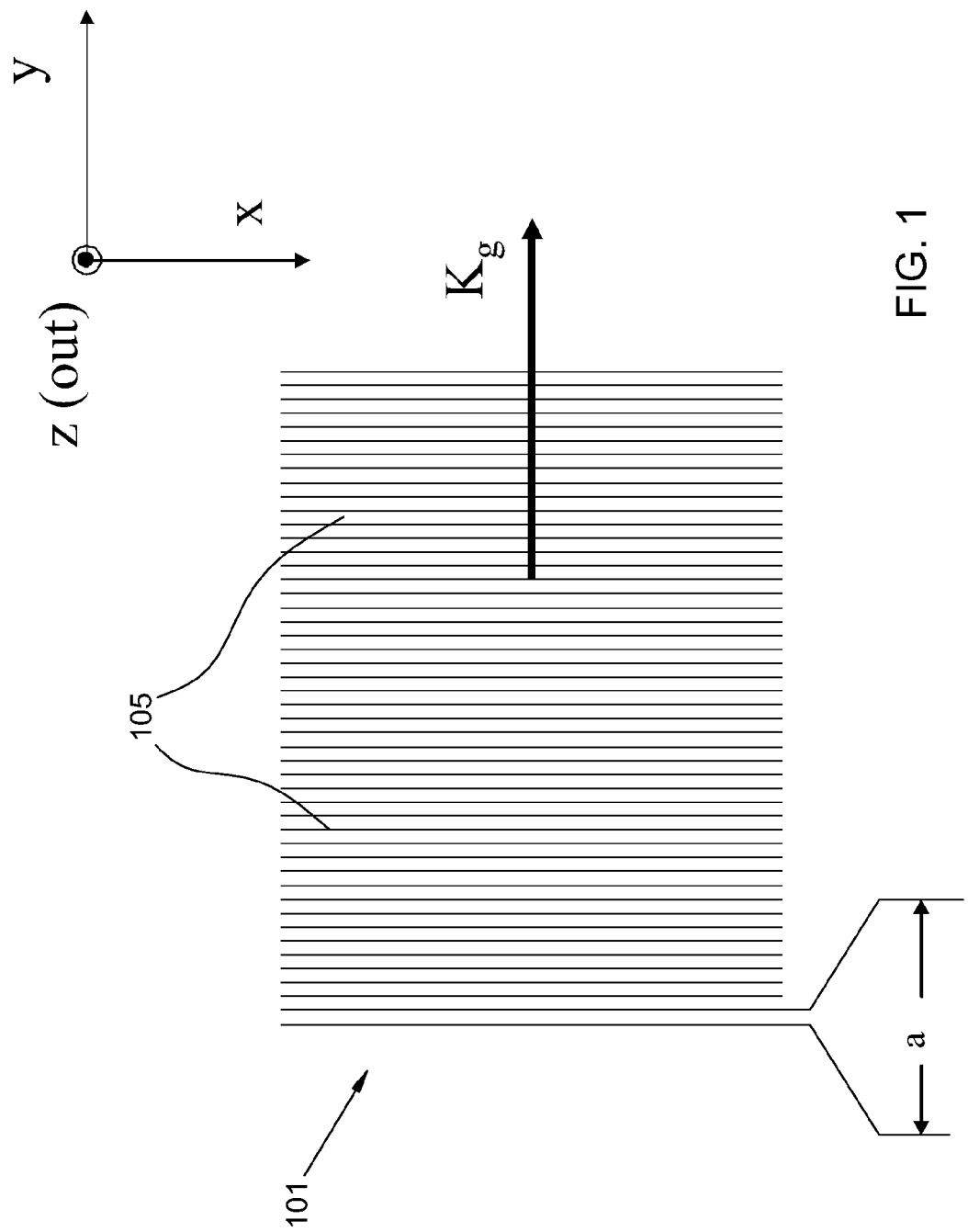
FIG. 1 is a schematic diagram of a diffraction grating.

In many of the drawings, a diffractive facet or sub-facet is shown with a small number of diffractive contours (2 or 3 up to perhaps a few dozen). The number of diffractive contours shown is typically far smaller than the number of such contours that are actually present on an article (often several dozen, hundreds, or more). The number of diffractive contours shown is reduced in number for clarity of illustration.

The number of sub-facets shown comprising a diffractive facet is typically reduced in a similar manner.

The embodiments shown in the Figures are exemplary, and should not be construed as limiting the scope of the present disclosure or appended claims.

DETAILED DESCRIPTION OF EMBODIMENTS

A centerpiece of many pieces of jewelry is a gemstone (diamond, cubic zirconium, etc.) that produces a pleasing visual appearance by reflecting or refracting incident light from one or more of a multitude of facets. Some light reflected or refracted from the gemstone, particularly light that is reflected from an outer surface of a facet without being transmitted, exhibits no dispersion, i.e., all color components of the light are reflected in essentially the same manner. A viewer whose eye catches such a reflection sees a color representative of the spectrum of the incident light. For example, under typical ambient illumination conditions, the viewer would see white light reflected from the gemstone; other illumination conditions would result in correspondingly different reflected light being seen by the viewer. The sparkles of typically white light produced by facet reflection comprise the so-called brilliance of the gemstone. Light that enters the gemstone to reemerge (with or without internal reflection) can exhibit dispersion as a result of wavelength dependent refraction upon transmission through one or more facet surfaces, i.e., differing constituent colors of the illuminating light emerge propagating along different output directions. Under white light illumination, a viewer of such refracted light would typically see the light as colored because only a portion of the spectral bandwidth of the illuminating spectrum would enter his or her eye. Light emitted by the gemstone that has experienced dispersion comprises the gemstone's so-called fire, which comprises flashes of colored light observed as the viewer, gemstone, or light source move relative to one another.

Both brilliance and fire are important in enabling a gemstone to produce the most pleasant viewing experience. This is similarly true in the case of diffraction gratings or other diffractive structures used to enhance packaging through the creation of attractive visual displays.

Disclosed herein are jewelry or other decorative or ornamental articles having arrays of diffraction gratings (reflective or transmissive) for producing visual effects including brilliance, fire, or both that appear similar to those of high quality gemstones. The array of diffraction gratings can be arranged so as to reproduce the appearance of facets, even on a substantially planar surface of an article. The array of gratings can be arranged so that the diffracted light appears to emanate in a pleasing manner as from a traditional gemstone. The array of gratings can be arranged so as to create visual effects not found in traditional jewelry or gemstones, for example, the distribution of facets may create visually pleasing patterns that change dynamically (rotate, expand, deform, or otherwise change) with changing relative positions of the observer, the article with the array of gratings, and one or more light source. The array of gratings can be arranged so as to incorporate an additional optical attribute not found in typical gemstones, namely, a focusing attribute imparted onto light reflected or refracted by the article. The array of gratings can be arranged so as to provide visibility over wide viewing areas or angles.

Arrays of diffraction gratings exhibiting one or more of the attributes recited in the preceding paragraph can be fabricated on the surface of metal jewelry articles (rings, earrings, brooches, pendants, bracelets and such) instead of or in addition to one or more gemstones, and can be used to create unusual visual effects enhancing the visual appeal of such articles.

Diffractive structures possessing at least one of above attributes on a substantially transparent or reflective substrate can be employed to create an attractive visual display for home or workplace decoration, decorative packaging, posters, or other decorative or ornamental articles. If desired, such articles can be mass-produced on a polymer or other inexpensive substrate using embossing, stamping, injection molding, or other suitable replication technique.

For illustrative purposes only, a surface diffraction grating 101 is shown schematically in FIG. 1. The grating 101 defines a substantially planar surface assumed in this example to lie in the xy-plane. Grating 101 can be characterized by a complex surface reflectivity having a periodic spatial variation, complex reflectivity denoting reflectivity that includes both amplitude and phase of the reflected light. The surface normal vector of the grating 101 is N, which in this example is parallel to the z-axis. In a more general case the grating surface can be curved, in which case the grating normal is position dependent and is defined locally relative to a plane tangent to the surface of the grating. The reflectivity can vary periodically in amplitude, phase, or both as a function of position on the grating surface. In general, the grating comprises regions of constant reflectivity that can be generally referred to as diffractive contours 105. In the example of FIG. 1, those diffractive contours are substantially straight lines substantially parallel to the x-axis. The reflectivity of the grating of FIG. 1 is therefore substantially invariant with respect to translation parallel to the x-axis and exhibits periodic variation with respect to translation along the y-axis. The orientation of the diffractive contours in FIG. 1 and the reference axes are chosen for expositional convenience only. As described further below, diffractive contours 105 can be straight (as in FIG. 1) or can follow curvilinear paths. They can be continuous (as shown in FIG. 1) or they can be dashed, segmented, or otherwise partially formed (i.e., "written") to control overall effective contour reflectivity, to enable overlay of multiple grating structures, or for other reasons. The grating 101 can be constructed at an article surface or it can be overcoated with one or more additional layers of material so as to reside within a volume of material. At least one, and perhaps both, of the substrate or overcoating material is preferably transparent over an operating spectral range over which the diffractive device is intended to provide output light. In many examples that range is the visible portion of the electromagnetic spectrum.

The grating 101 can be characterized by a wavevector $K_g$ which lies in the plane of the grating and is oriented perpendicular to the diffractive contours 105. The magnitude of $K_g$ is 1/a, where a is the spacing between diffractive contours measured along a mutual normal direction. In gratings more complex than the example of FIG. 1, e.g., having curved or variably spaced diffractive contours, the grating wavevector can be defined locally for small regions over which contour spacing and orientation is relatively constant. Alternatively, the grating can be characterized in terms of a spatial Fourier transform which provides a decomposition of the structure as a superposition of multiple wavevectors. Various examples of each of those cases are described below.

Monochromatic light having wavelength λ, incident on the grating from some direction, can be assigned a wavevector $k_{in}$ oriented along a direction normal to its wavefront. In the language of geometrical optics, $k_{in}$ is parallel to the ray representing the input light. The wavevector $k_{in}$ has the magnitude 1/λ. When the input light has a range of spectral components, wavevectors having a corresponding range of magnitudes can represent the various spectral components. When the input light has a spatially varying wavefront, the wavevector can be defined locally for small regions over which the wavevector is relatively constant.

Figure 2:
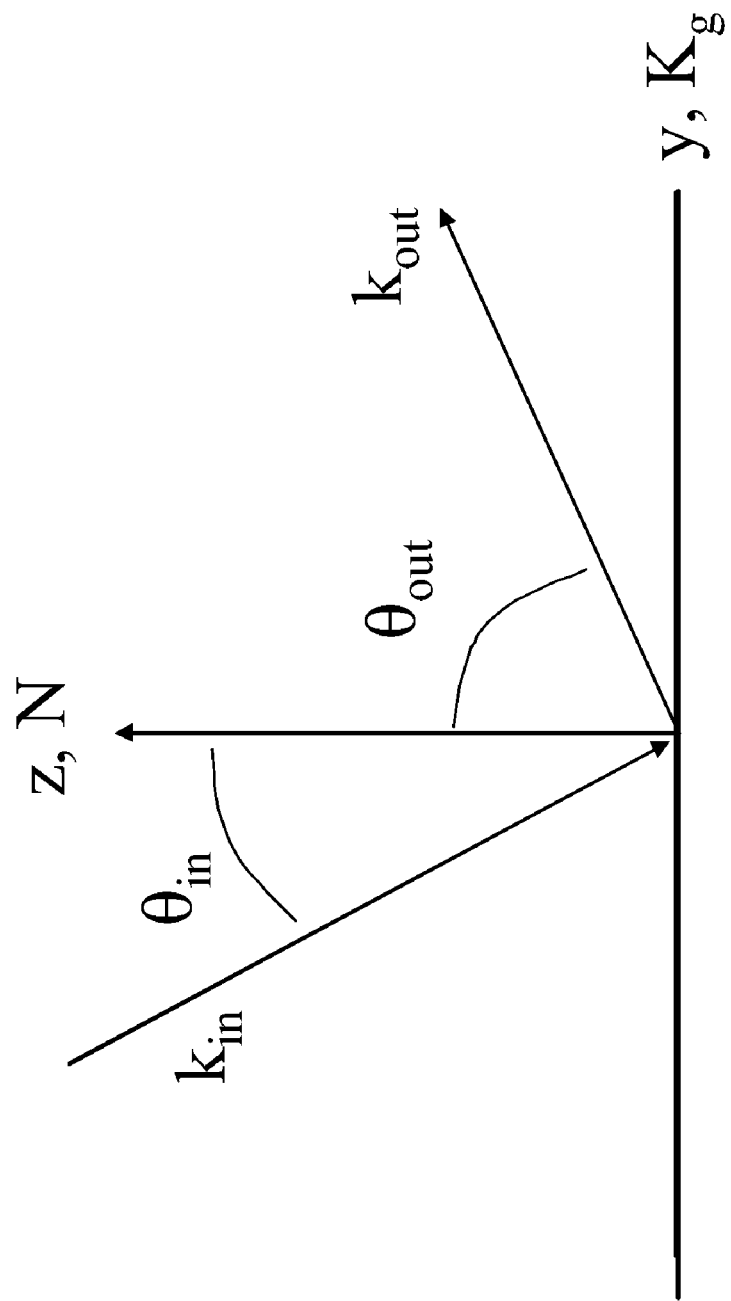
FIG. 2 illustrates schematically input, output, and gratings wavevectors.

The case wherein $K_g$, $k_{in}$, and N are substantially coplanar (i.e., when $K_g$ lies in the plane of incidence) is schematically depicted in FIG. 2. In that case the grating properties, input and output directions, and the wavelength are related according to the equation:

$$m\lambda = a \sin \theta_{in} - a \sin \theta_{out},\qquad \text{Eq. 1}$$

where m is any integer (including zero) that provides a real solution for the output angle. The output angle is defined to be positive when on the opposite side of the surface normal relative to the input angle. Since the output angle of Eq. 1 depends on the wavelength of the incident light for solutions with m≠0, the output angle will vary with input wavelength providing a potentially pleasing dispersion or "fire" effect.

In more general cases, when the grating wavevector $K_g$ does not lie in the plane of incidence, the output wavevector can be determined by decomposing the input wavevector into component parallel and perpendicular to the plane of the grating. Those components are denoted $\vec{k}_{in}^{P}$ and $k_{in}^{z}$, respectively. Analogous components for the output wavevector are $\vec{k}_{out}^{P}$ and $k_{out}^{z}$. The values permitted for those quantities are given by the equations:

$$\vec{k}_{out}^{P} = \vec{k}_{in}^{P} + m\vec{K}_g;\qquad \text{Eq. 2a}$$

$$k_{out}^{z} = \sqrt{(k_{in}^{2} - k_{out}^{P\,2})}.\qquad \text{Eq. 2b}$$

where m is any integer including zero that results in a real value for $k_{out}^{z}$.

Eqs. 1, 2a, and 2b indicate that a single input beam can generate one or more output beams and except for the output beam corresponding to m=0, the output directions are color dependent, i.e., they exhibit dispersion. The m=0 beam is the specular reflection expected from any substantially smooth dielectric or metallic surface and is not directionally controlled by the diffractive structure. The number of output beams is determined by the magnitude and orientation of $\vec{K}_g$ relative to $\vec{k}_{in}^{P}$. Choice of $\vec{K}_g$ to provide at least one m≠0 output is preferred. Large numbers of output beams (available when the magnitude of $\vec{K}_g$ is small compared to the magnitude of $\vec{k}_{in}$) provide for more viewing angles at which output light is observed, but available light intensity is divided among the output beams lowering maximal perceived brightness. A trade off between number of viewable directions and brightness must be made to provide for maximal subjective sensation of beauty.

Diffractive Brilliance

A diffraction grating or an array of diffraction gratings that redirect light having a specifically desired output spectrum (all or part of the input spectrum), is desirable for creating visually pleasant effects in jewelry, watches, packaging, window ornaments, or other decorative or ornamental articles that yield an attractive visual display.

FIG. 3A is a schematic diagram of a human eye 301 viewing two discrete objects 311 and 312. Light from the objects enters the eye 301 and forms a retinal image. Depending on the distance between the objects, the distance from the objects to the eye, and the operating conditions of the eye (pupil aperture, visual acuity, etc.) the retinal images of the objects will be distinct (resolved, as images 321a and 322a in FIG. 3B) or overlap (unresolved, as images 321b and 322b in FIG. 3C) to some extent. If the retinal images are distinct (321/322a), the color of the individual objects 311/312 can be discerned by the viewer. If the retinal images substantially overlap (321b/322b), the perceived color of the objects 311/312 corresponds to the additive sum of the colors of the individual objects. By providing a multitude of unresolved objects each having a specific color (or set of colors), any desired overall spectrum can be constructed by suitable color mixing. Such color mixing can be used to create visual effects having colors of various hues and saturation.

The conditions under which objects will be visually resolved varies among individuals based on visual acuity, corrective lenses (if any), illumination level (which affects pupil size), and so forth. Diffractive effects set the ultimate limits on resolving power of the eye. For mid-range visible light and roughly a 2 mm pupil diameter, diffraction alone results in a minimum resolved size of about 250 μm for viewing objects from a distance of about 50 cm. Objects closer than approximately 250 microns typically cannot be resolved when viewed from a distance of 50 cm of more. Diffraction-limited resolution limits vary inversely with wavelength, however, actual visual resolution limits tend to exceed diffractive limits to an extent specific to each individual.

The term "facet" as used herein shall refer to a given area of an article having thereon a diffraction grating, or an array of diffraction gratings, that is arranged according to common, designed input and output direction(s) and wavelength(s). Such a diffractive facet can comprise a substantially flat areal segment of a three-dimensional surface, analogous to a "facet" of a traditional gemstone. "Diffractive facet" can also or instead denote a particular areal segment of a curved or substantially planar surface of an article, which may or may not include other diffractive "facets." "Arrays" of diffraction gratings are referred to herein. In some instances such a grating array can correspond to an array of diffractive facets on a surface of an article, wherein each diffractive facet comprises a particular grating structure (of any suitable or desired level of complexity) over its entire area. In other instances a grating array can refer to an array of sub-facets having differing grating structures that together comprise a diffractive facet. Each of these instances is described in more detail below.

In FIG. 4A, an exemplary diffractive facet 410 is illustrated schematically that comprises an array of three diffraction gratings 411, 412, and 413 (also referred to herein as sub-facets). Input light 403 containing a multitude of spectral components (e.g., white light) is incident on the facet 410 along a given input direction. The diffractive properties within each sub-facet 411/412/413 are configured so that light having color within a chosen sub-bandwidth is diffracted by that sub-facet along a respective direction 431/432/433 so as to enter an observing eye 401 as shown in FIG. 4A. An observer sufficiently far from the facet 410 observes superimposed images 421/422/423 of the sub-facets (as in FIG. 4B). The physical sizes characteristic of the sub-facets 411/412/413 are chosen so that the sub-facet images (or at least those of operational significance) are separated by less than the resolution limit of eye 401, resulting in spatial overlap of the images 421/422/423 on the observer's retina 402. If, for example, the sub-facets are configured to direct the additive primary colors (i.e., red, green, and blue) in appropriate proportions to the observer, the observer will see a white image resulting from the overlap of images 421/422/423 (as in FIG. 4B).

The sub-facets 411/412/413 can be configured to direct arbitrary relative proportions of power to the observer at arbitrary chosen wavelengths. The overall area of facet 410 can be divided among the sub-facets equally or unequally so as to direct desired relative amounts of power to the observer. For example, a sub-facet arranged to diffract blue light to the observer can be made larger in area than other sub-facets, if a larger amount of blue light is desired to be directed to the observer. The diffractive facet 410 need not be limited to only three sub-facets, as shown in FIG. 4A. Instead, a diffractive facet can be subdivided into a multitude of sub-facets, each diffracting a corresponding wavelength component as described above. In some instances each sub-facet of the multitude can diffract a corresponding wavelength component distinct from all the others. In other instances the multitude of sub-facets can comprise several subsets of non-contiguous sub-facets, the sub-facets of each subset diffracting a corresponding common wavelength component. In either case, the sub-facets in such examples are sufficiently small so that the images of adjacent sub-facets overlap on an observer's retina under typical observing conditions, and are sufficiently numerous to cover the desired area of the diffractive facet. Subsets can be arranged so that adjacent sub-facets that produce overlapped images diffract differing wavelength components. Viewed from the proper direction relative to the illumination direction and the grating wavevectors, the entire diffractive facet (or at least a substantial portion thereof) would appear white to the observer (assuming subsets diffracting red, green, and blue spectral components in the appropriate proportions are present). The image of that white-appearing area can substantially exceed the size of the observer's visual resolution limit. The perceived effect is analogous to the visual perception of a white area displayed on a tube-type television screen when viewed from a typical viewing distance, which when viewed very closely can be seen to comprise individual red, green, and blue dots or pixels (that are smaller than the visual resolution limit when viewed from the more typical distance).

As known in the art of additive color displays, a wide range of perceived colors can be created by combining the primary additive colors in varying relative intensities or proportions. An arrangement similar to the ones described above can be employed to produce nearly any desired color, hue, or tint by combining the appropriate intensities of suitably chosen "primary" colors (red, green, and blue being the typical choices). Configuring the relative areas of the sub-facets in proportion to the color admixture needed to produce a desired color enables the observer to perceive the desired color. Other attributes of the sub-facets can be adjusted to control the relative power diffracted within its respective spectral bandwidth to the observer. In one example, the order of the grating (e.g., the value of m in Eq. 1) of a sub-facet can be chosen (by selecting a suitable spacing its diffractive contours) to change the power diffracted by the sub-facet. In another example, individual diffractive contours can be only partially formed or written, e.g., in the form of dashed or segmented contours rather than continuous contours. Such partially written diffractive contours diffract light in proportion to the fraction of the contour that is written, thereby enabling flexible control of power diffracted from a sub-facet independent of its area. Such partial writing of diffractive contours is described in: "Effective grayscale in lithographically scribed planar holographic Bragg reflectors," D. Iazikov, C. Greiner, and T. W. Mossberg, Applied Optics 43, 1149-1155 (2004), which is hereby incorporated by reference as if fully set forth herein. In another example, diffractive contours can be divided into coherent sets and relatively displaced along the sub-facet surface, as described in: "Interferometric Amplitude Apodization of Integrated Gratings," T. W. Mossberg, C. Greiner, and D. Iazikov, Optics Express 13, 2419-2426 (2005), which is hereby incorporated by reference as if fully set forth herein. In another example, the cross sectional profile of the diffractive contours can vary among sub-facets (for example, by blazing) to control total power diffracted in the intended observational direction. Blazing can be incorporated in the traditional manner (sloped or angled diffractive contour cross sections) or by other techniques wherein the effective reflected amplitude and phase are determined by bi-level or multi-level lithographic fabrication techniques to approximate the amplitude and phase reflectivity of a traditional sloped surface. Many of these techniques are disclosed in: U.S. Pat. No. 6,678,429; U.S. Pat. No. 6,829,417; U.S. Pat. No. 6,965,716; U.S. Pat. No. 6,993,223; and U.S. Pat. Pub. 2006/0177178. Those references are indicative of the state of the art available for forming diffractive elements incorporated into decorative, ornamental, or jewelry articles according to the present disclosure.

The sub-facets 411, 412, and 413 can be formed with diffractive contours having differing spacings $a_1$, $a_2$, and $a_3$, respectively, so as to be effective in directing chosen spectral bands to the observer in accord with Eq. 1 or Eqs. 2a and 2b. In some cases it may be desired to have a number of sub-facets (or sub-facet subsets) different than the three shown in FIG. 4A. Any suitable number of sub-facets or sub-facet subsets can be incorporated within a diffractive facet in accordance with the resolution conditions discussed above to achieve a desired perceived color diffracted from that facet.

In some instances, the sub-facets (or subsets of sub-facets) can be arranged within the corresponding diffractive facet so that the perceived color of the diffractive facet is substantially uniform over its area. In other instances, the sub-facets (or subsets of sub-facets) can be arranged within the diffractive facet so that the perceived color of the sub-facet varies across its area (in any desired manner, e.g., continuously or discretely).

In FIGS. 5A-5D several exemplary sub-facet arrangements are illustrated schematically. In each of these examples, the relative intensities diffracted by each sub-facet can be varied as already described.

Figure 5D:
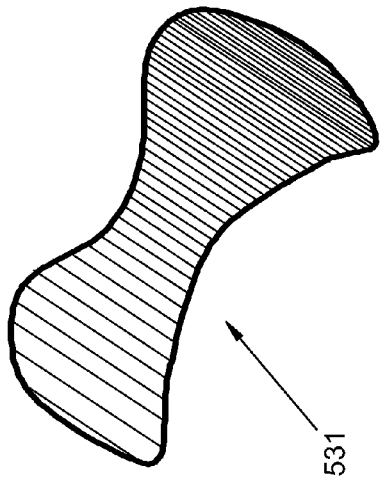
FIGS. 5A-5D illustrate schematically several exemplary arrangements of arrays of gratings.
Figure 5C:
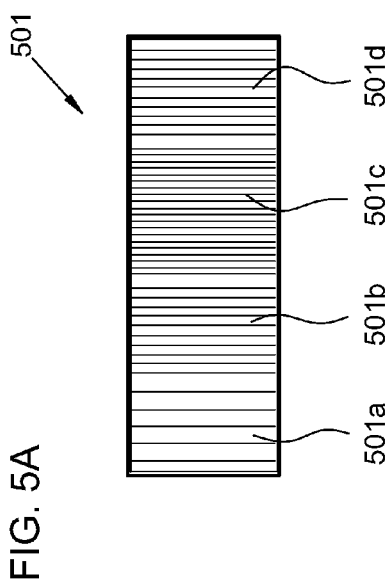
Figure 5A:
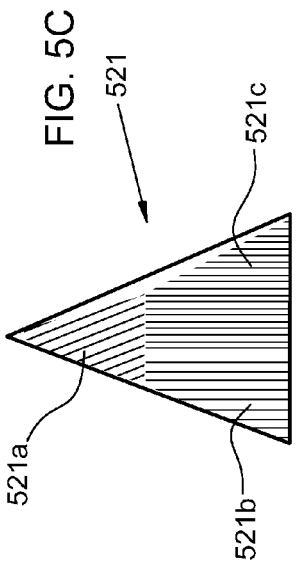

In FIG. 5A, a diffractive facet 501 is shown that includes an array of four sub-facets 501a/501b/501c/501d. In this example, each sub-facet includes straight, uniformly spaced diffractive contours. The spacing varies among the sub-facets so that different colors of light incident along a chosen input direction are diffracted into the eye of an observer at a chosen viewing position. As explained above, the light additively diffracted into a common area of the observer's retina can enable diffractive redirection of white light while retaining the perception of whiteness (or of some other composite color chosen by the designer). Typical spacings between diffractive contours can typically fall in the range of approximately 0.2 µm to 5 µm as determined by Eq. 1 or Eqs. 2a and 2b, the color being diffracted, and the input and output directions.

Figure 5B:
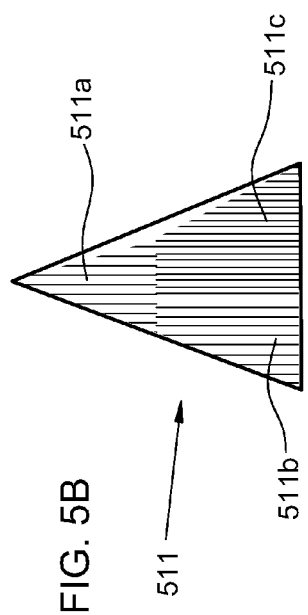

In FIG. 5B, a diffractive facet 511 of non-rectangular shape is depicted that includes an array of three sub-facets 511a/511b/511c. As depicted, the sub-facets need not lie along a line and instead may assume any relative positions within the overall arbitrarily shaped diffractive facet 511, provided that those sub-facets that must overlap to form the desired color mixture are spaced closer than the resolution limit for the intended viewing conditions.

The diffractive contours within the sub-facets of a facet may have any relative orientation consistent with Eq. 1 or Eqs. 2a and 2b and the selection of colors to be routed from the input direction to the output observation direction. In some cases, it may be desired to route spectral components to a single observation direction even though those components originate at different source points. In such cases, non-parallel sets of diffractive contours among the sub-facets 521a/521b/521c of diffractive facet 521 can be advantageously employed, as shown schematically in FIG. 5C.

In FIG. 5D, an irregularly shaped diffractive facet 531 is shown that contains no discrete sub-facets. Instead, the spacing between diffractive contours varies continuously across the facet 531. Eq. 1 or Eqs. 2a and 2b can still be applied, using the local diffractive element spacings to diffract selected color bandwidths to a chosen observer. The contours need not be parallel as shown, but can be continuously rotated or discretely rotated to direct light from multiple sources to a single chosen observation direction or conversely to make the facet visible from multiple observation directions with the same or differing perceived colors. The variation in contour spacing or orientation need not be monotonic.

As already noted, diffractive facets actually employed on a decorative item can contain many "simple facets" similar to those described above. The "simple facets" in FIG. 4 and FIGS. 5A-5D are each shown including only one set of color-blending sub-facets. More typically, diffractive facets will comprise an array of many (perhaps tens, hundreds, or more) such "simple facets." The simple sub-facets shown in FIG. 4 and FIGS. 5A-5D can be regarded as elemental in that each such set collectively enables color control over output light. The simple sub-facet is subject to the spatial resolution requirements described above. An arbitrarily large diffractive facet can be constructed by assembling as many elemental sub-facets as needed to fill it. The sub-facets of common character (i.e., of a common subset) can be positioned coherently if high directionality and high spectral purity of diffracted output light is desired. Alternatively, addition of increasing incoherence between sub-facets of common character will produce angular and spectral blur of the diffracted output, which in some instances can be desirable, e.g., to increase viewing angles available or to soften output color tones. "Coherence" refers to an arrangement wherein sub-facets of common character are positioned as if their respective contours were coincident with those of a single, virtual, uniform reference diffractive structure filling the entire diffractive facet. "Incoherent" refers to an arrangement wherein sub-facets of common character have varying displacements relative to such a reference diffractive structure. It may be noted that sub-facet subsets can be made to vary in character across a diffractive facets. This can be advantageous when the diffractive facet is sufficiently large, to compensate for variations in input and output directions between a design light source and designed observer positions. In many situations, such variation in sub-facet character may not be necessary.

In FIG. 4 and FIGS. 5A-5D, diffractive facets having simple diffractive contours are shown (i.e., having parallel straight lines, uniformly spaced in each sub-facet in all examples but one). More complicated diffractive structures can be employed, e.g., sub-facets having a multitude of wavevectors or extending across large parts or all of a diffractive facet. Multiple wavevector gratings have distributions of diffraction contours that can be non-uniform in amplitude or spacing. Such multi-wavevector gratings can provide the multitude of colors in output directions that are needed to produce the sensation of white or other chosen hue from a single sub-facet. In other words, the diffractive facet can comprise a set of exactly one sub-facet that diffracts the desired color mixture. Such diffractive structures can be designed, for example, by employing Fourier analysis of the desired wavevectors instead of direct analysis of the spatial structure of the sub-facet. The grating wavevector appearing in Eqs. 2a and 2b can be just one wavevector component of a 2D spatial Fourier decomposition of the diffractive contour structure. The diffracting structure itself may contain diffractive contours comprising lines, points, curves, segments, or other structures. Such a diffraction grating exhibits a multitude of wavevectors, and exhibits diffractive characteristics that are essentially invariant when measured over portions of the overall grating area having size at least as large as needed to resolve the various grating Fourier components. Such gratings can be advantageously employed because the overall grating area need not remain smaller that the visual resolution limit. Multiple wavevector gratings can diffractively redirect light of chosen design color regardless of its size.

Figure 6A:
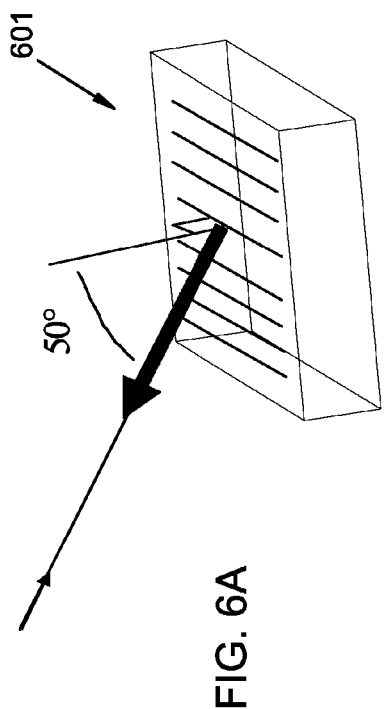
FIGS. 6A-6C illustrate schematically an exemplary grating its reflectivity as a function of position.

To design such a grating, the grating wavevectors needed to diffract the desired color mixture (from the desired input direction to the desired output direction) are determined as in the case of discrete sub-facets using Eq. 1 or Eqs. 2a and 2b. The corresponding spatial structure of the diffractive facet is determined by spatial Fourier transform. In FIG. 6A, a multi-wavevector grating 601 is schematically shown diffracting the primary additive color components to an observer from a white light source (in a Littrow configuration in this example; other input or output direction can be employed). In this example the grating 601 has the three wavevectors required with magnitudes appropriate for the color mixture desired to be diffracted. A representative calculated surface reflectivity as a function of position (in μm) along the grating is shown in FIG. 6B that results from the Fourier transform of the grating wavevectors required to diffract three diffracted color bands chosen to be 420 nm, 525 nm, and 650 nm. That spatial reflectivity distribution (i.e., the arrangement and reflectivity of the diffractive contours of the desired grating) can be approximated by the discrete reflectivity distribution shown in FIG. 6C. The diffractive contours represented in FIG. 6C have varying spacing and relative reflective amplitude. The desired reflective amplitudes of the various contours can be achieved by partial writing or other methods described above and in various of the references mentioned herein. The locations of the diffractive contours are chosen to coincide with the peaks of the calculated reflectivity of FIG. 6B. Any other physical embodiment approximating the calculated reflectivity of FIG. 6B can be employed; many such embodiments are known in the art or disclosed in various of the references mentioned herein. Those that can be realized using binary-compatible fabrication techniques can be advantageously employed.

Figure 6C:
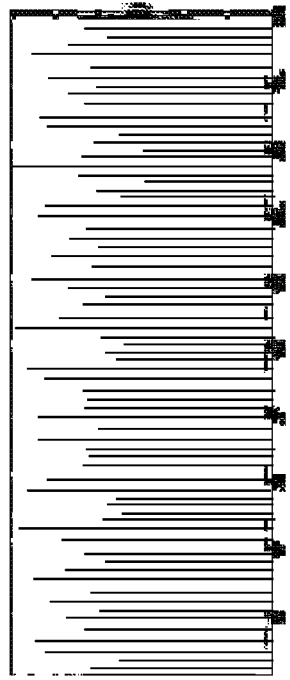
Figure 6B:
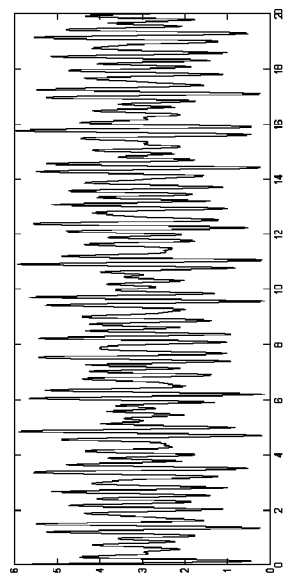

As exemplified in the discussion of FIGS. 6A-6C, diffracting devices having desired visual properties or sets of desired visual properties (such as certain diffractive colors, including white, observed from one or more observation directions) can be designed by choosing the appropriate grating wavevector values (magnitude and direction) and then deriving a corresponding grating spatial structure that exhibits the desired properties by Fourier transform of the chosen wavevectors from wavevector space to position space. Gratings structures calculated in this way may have a substantially complex spatial structure, but are not subject to the same spatial resolution limit prevailing for subsets of discrete color mixing sub-facets.

The teachings of U.S. Pat. No. 6,993,223, which discloses combinations of multiple grating structures within a facet (overlaid or interleaved), are indicative of the state of the art available for forming diffractive elements incorporated into decorative, ornamental, or jewelry articles according to the present disclosure.

In some instances, diffractive facets that appear white (when illuminated from a suitable direction) can comprise a uniform periodic grating, provided that its periodicity is set to a value that results in spatial overlap of multiple color components along an output direction. Such overlap can arise from light incident along a multitude of input directions from an extended illumination source, or from overlap of a multitude of output diffraction orders (i.e., a multitude of different m values in Eq. 1 or Eqs. 2a and 2b). Each of those situations can be more readily implemented using diffraction gratings having relatively large spacings. An example of the first situation can be achieved with a grating having a period of 1.93 µm. Such a grating diffracts (in the first diffraction order) wavelengths of 400 nm, 525 nm and 650 nm along the same output diffracted angle of 30° when illuminated by those wavelengths at incident angles of 45°, 50.5° and 56.8°, respectively. Those incident angles can arise, for example, if a spatially extended white light source subtends and angle greater than about 12° with respect to the grating. An example of the second situation can be achieved with a grating having a period of about 50 µm which, for white light incident at 45°, diffracts 414.2 nm light into the $25^{th}$ diffracted order, 545 nm light into the $19^{th}$ diffracted order, and 647.2 nm light into the $16^{th}$ diffracted order, all into the same output angular direction of 30°.

In FIG. 7 an extended optical source 701, such as a ceiling illumination panel, and a diffracting facet 717 are shown schematically. Light striking the facet from different points on the extended source produces color-dispersed output fans 705, 709, and 713 that are angularly shifted relative to one another. An observer 721 positioned near the center of the angular distribution of output rays receives multiple different color components simultaneously, corresponding to the dispersed output of input light incident from different location on the extended source. This tends to produce an increasing perception of white as the angular distribution of input rays exceeds the angular output fan produced by a single light source location. The angular width of an output order produced by a collimated (single source) input generally decreases as the spacing between grating lines increases (for a constant diffraction order and a given spectral width of the incident light). To produce a perception of white light using an extended source, a grating spacing can be chosen that produces output angular spreads smaller than the angle subtended by the source at the location of the facet under the intended illumination and observation conditions. The angular output width produced by the grating 717 will depend on input and output directions as well as the grating spacing. In calculating the appropriate spacing, any suitable diffraction order can be chosen. This exemplary arrangement for producing white diffracted light is typically most effective when the observer is located in the angular vicinity of the specular reflection of the source by the grating surface (i.e., at low diffraction orders), because lower diffraction orders are angularly narrower than higher orders.

Even if the source illuminating the facet is point-like, a white facet appearance can be produced by a grating having uniformly spaced parallel diffractive contours, provided that multiple diffraction orders angularly overlap so as to produce the needed color components at the desired output angle. Typically such an implementation requires relatively longer grating periods and large diffraction angles (i.e., higher diffraction orders, farther from the specular reflection). Under such conditions, diffraction orders are plentiful and the output angular width of a given order is relatively large. A design resulting in white diffracted output would include choosing desired input and output angles and choosing a grating spacing that results in red, green, and blue components of adjacent diffracted orders to emerge along the chosen observation direction. Because diffraction strength typically varies with diffracted order, producing the appropriate combination of color weights can be problematic in some instances.

FIG. 8A illustrates schematically an assemblage of diffractive facets 801 such as might be utilized to form an attractive jewelry item. The facet arrangement is geometrically similar to the crown facets and table facet of a brilliant-cut diamond. The facets 801 are typically formed on a flat substrate, however, unlike the three-dimensional arrangement of the facets of a diamond. Each circumscribed region 801 is a diffractive facet and includes diffractive structures providing fire or white sparkle or a combination of the two. The geometrical arrangement of facets within a decorative diffractive article is important to producing a visually pleasing experience. The use of non-rectangular facet geometries can be particularly pleasing especially when combined in well-known shapes, such as the brilliant cut (familiar from diamonds) and the mariner's compass. The facets 801 in FIG. 8A individually comprise triangles, quadrilaterals, and a central octagon. The central facet is shown with a multitude of sub-facets; the sub-facets of diffractive contours of the other facets are not shown. The sub-facets of the central diffractive facet comprise narrow stripes indicated by the lines within the central facet in FIG. 8A. Five of those sub-facets are shown enlarged in FIG. 8B. The diffractive contours within each sub-facet comprise straight, parallel lines and the spacing between said lines varies among the sub-facets sequentially between three values.

The sub-facets of common character are labeled $s_1$, $s_2$, and $s_3$. The sub-facets are sufficiently narrow so that, measured across their narrow dimension (approximately perpendicular to the diffractive contours), at least three adjacent sub-facets fall below the visual resolution limit for the desired viewing conditions. The sub-facets can have varying widths to control their relative output intensities, or those intensities can be controlled by other means disclosed herein. The optical functionality of the central facet is schematically depicted by the coordinates and input and output beams shown in FIG. 8C. The z-axis direction is normal to the plane of the facets 801. White illumination is assumed incident at 45° relative to the z-axis in the xz-plane. Input color components with wavelengths of 450 nm, 550 nm, and 650 nm are redirected by sub-facets $s_1$, $s_2$, and $s_3$, respectively, so that they emerge perpendicular to the input white light and they are diffracted at an angle of 60° from the z-axis in the yz-plane. The grating wavevectors in the three distinct types of sub-facet $s_1$, $s_2$, and $s_3$ have wavevectors of 2.48, 2.03, and 1.72 inverse microns; those grating wavevectors are directed in a direction in the xy-plane about 39° from the y-axis toward the −x direction (upward in FIG. 8B). This arrangement can be advantageously employed, for example, as a jewelry piece to be worn as part of a dangling earring so that the x-axis is vertical. In that arrangement, incident light from overhead room lighting is redirected toward the front of the wearer and appears substantially white. The central facet also can be viewed at various other output angles, along which different sets of wavelengths are combined. The central facet will appear white in the design direction and assume colors of various hues as observations are made increasingly displaced from the designed observation angle.

Figure 9A:
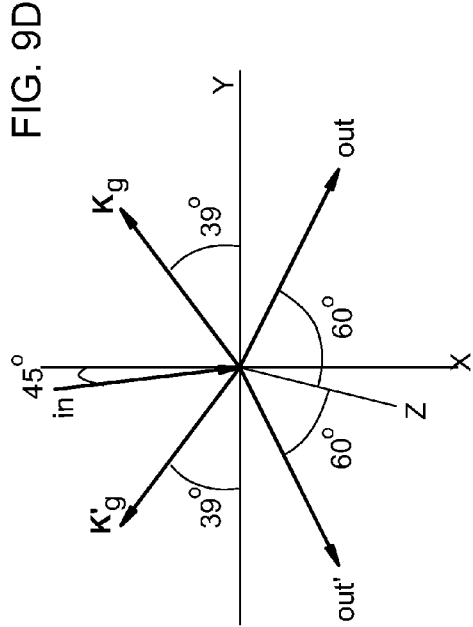
FIGS. 9A-9D illustrate schematically an exemplary array of gratings arranged to resemble a faceted gemstone.
Figure 9B:
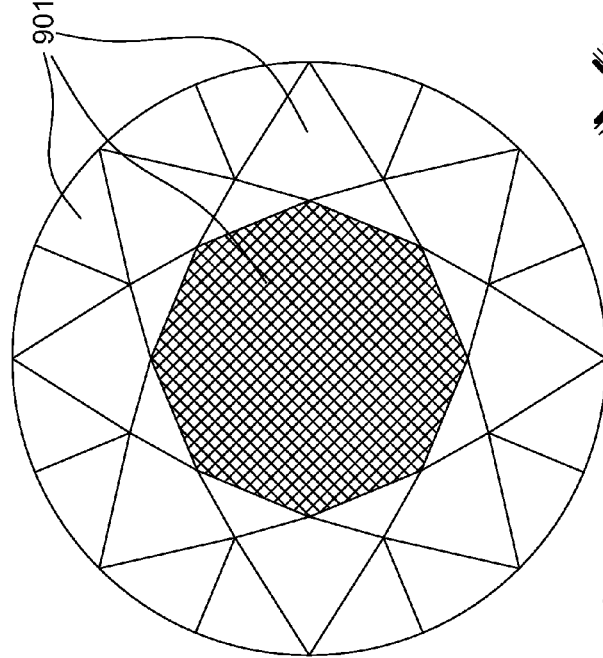
Figure 9D:
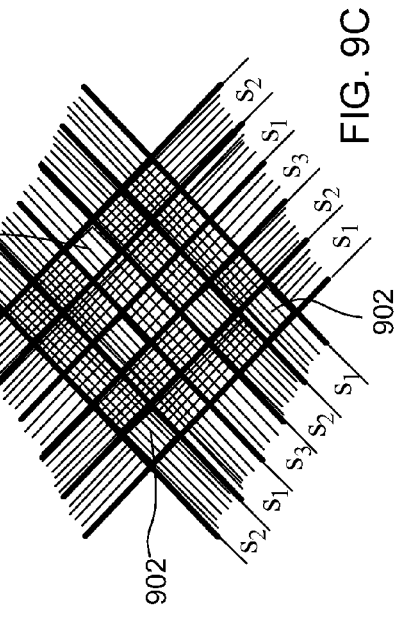
Figure 9C:
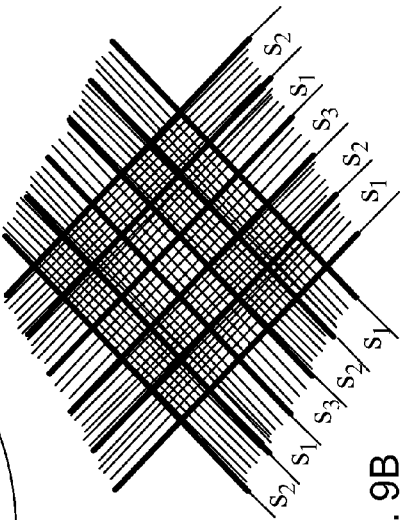

FIG. 9A illustrates schematically a similar facet arrangement, and again schematically highlights the diffractive structure only within the central facet. The other facets 901 typically have diffractive structures as well (one or more sub-facets, according to any suitable design). In contrast to the diffractive design of FIG. 8, the diffractive contour patterns illustrated in FIG. 9B or 9C provide for redirection of white output light both in the forward and backward directions as shown in the input-output diagram of FIG. 9D. In the arrangements of FIGS. 9A-9D, the diffractive structure of FIGS. 8A-8C is combined with an identical diffractive structure with the grating wavevectors rotated to approximately 39° above the negative y-axis. In FIG. 9B, the resulting grating pattern comprises mesas of varying size. In FIG. 9C, some of the quadrilateral sub-facets 902 have diffractive contours arranged in only one direction or the other, but not both. Any suitable arrangement of such sub-facets can be employed.

Diffractive Focus

In some instances, diffractive structures are employed to create attractive visual displays on walls and other surfaces by diffracting and dispersing light either in reflection or transmission. Grating structures employed for this purpose typically do not modify the wavefront of the incident signal (except to impart a color-dependent deflection). A grating formed with curved or variably spaced diffraction contours can provide wavefront transformation, such as focusing action. If the grating diffractive contours are defined by the constant phase curves of an interferogram formed computationally between intended input and output beams, the grating when fabricated will provide a similar wavefront transformation leading to convergent or divergent output according to design desire. Some aspects of interferogram-based design of diffractive structures are described in: U.S. Pat. No. 7,123,794; U.S. Pat. No. 7,190,859; U.S. Pat. No. 7,286,732; U.S. Pat. Pub. No. 2007/0053635; and U.S. patent application Ser. No. 11/376,714 filed Mar. 14, 2006. Those references are indicative of the state of the art available for forming diffractive elements incorporated into decorative, ornamental, or jewelry articles according to the present disclosure. Use of curvilinear or variably spaced diffractive elements for wavefront transformation enables visual display patterns of varying sizes to be made. In FIG. 10A a standard wavefront-preserving diffracting facet 1001 is shown. The diffractive contours are straight and uniformly spaced. In FIG. 10B a focusing grating facet 1002 is shown. The interferogram-derived diffractive contours schematically shown are curved and variably spaced. The diffractive facet of FIG. 10B can be employed to create visual displays having spot sizes freely chosen by design. Two or more diffractive facets such as those shown in FIG. 10B can typically be arrayed across an article surface to accept input light and diffract it into a designed pattern. The diffracted light may be of controlled color as described above, white, or substantially monochromatic.

Fabrication

Figure 17A:
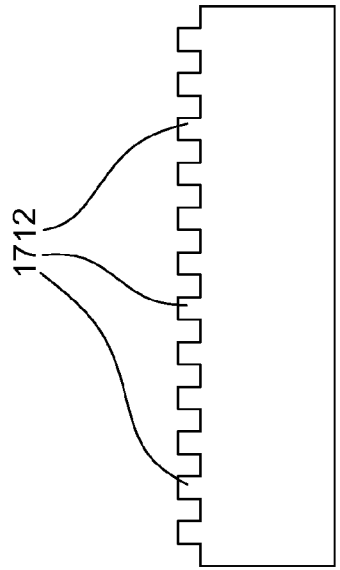
FIGS. 17A-17D illustrate schematically cross-section of several exemplary diffraction gratings.
Figure 17B:
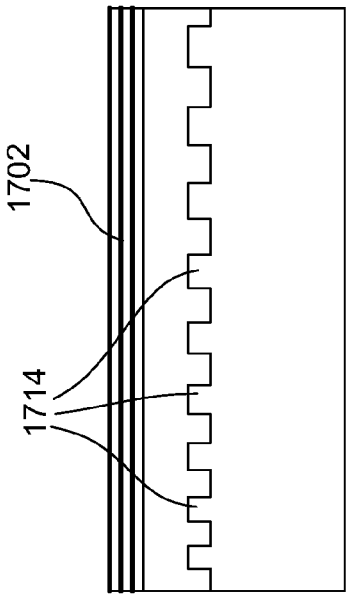
Figure 17C:
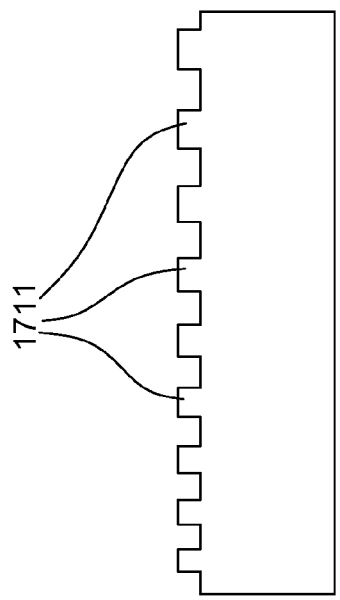

To fabricate diffractive devices as described above, one can employ traditional methods of mechanical ruling or interferometric exposure. Alternatively, and of particular utility in cases involving curvilinear diffractive contours or complex multiple wavevector spatial grating structures, the grating can be formed using many and various spatially-selective material processing techniques, e.g., techniques employed for semiconductor processing. Many such techniques suitable for forming the diffraction gratings disclosed herein are disclosed in various of the references mentioned herein. These techniques can include, but are not limited to, diffractive contours formed directly by laser writer or by e-beam, resist, and etch, or said techniques can instead be employed to create a reticle used in projection lithography. In projection lithography, the reticle is typically written on a larger scale than desired final devices. Typically projection lithography machines are set up to pattern silicon wafers which can be overcoated with metals (including precious metals such as gold or platinum) or dielectrics or other materials as desired. Other materials besides silicon can be patterned by the current methods of semiconductor fabrication as well. Lithographic patterning may be followed by etch producing grating contours approximately rectangular or trapezoidal in cross-section. Diffractive contours can be formed having other cross-sectional shapes, including triangular and rounded. In FIGS. 17A and 17B, cross-sections are shown of diffractive devices 1711 and 1712 having non-uniform and uniform line spacings, respectively. Protective substantially transparent coatings 1701 made of dielectric, polymer, or other material may be applied on top of the reflective grating layer 1713 to prevent damage or oxidation of the grating elements, or to control diffraction efficiency by reducing light wavelengths relative to physical sizes of diffractive structures (FIG. 17C). In the case of lithographic fabrication, gratings containing multitudes of wavevectors as described above are most conveniently approximated by a binary profile (as shown in FIGS. 17A-17D), which can introduce spurious Fourier components into the grating wavevector spectrum. For typical decorative or ornamental visual device applications, however, such imperfections typically do not significantly degrade performance.

Figure 17D:
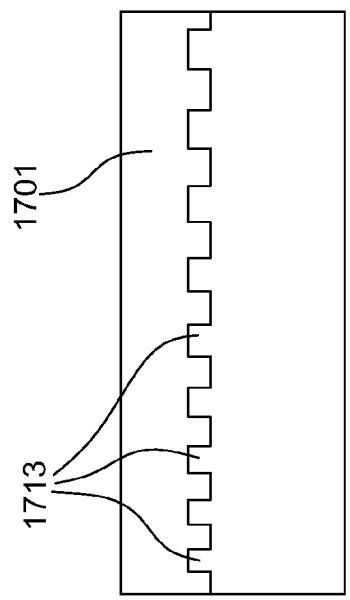

In some cases, it may be desirable to apply one or more dielectric layers 1702 on top of a diffraction grating 1714 on an article to form an interference-based thin film filter (FIG. 17D). Such a set of layers can be arranged to allow only a certain set of wavelengths to reach the diffractive article and emerge after diffraction into select output angles. Thus while gratings tend to produce outputs across wide spectral bands, the visual appearance of the article can be limited to certain colors or sets of colors by the applied thin-film filter. Alternatively, a material such as ruby or other colored material may be applied as a layer over the diffractive article. Such absorbing material will also limit the range of colors displayed by the decorative article and in addition, the absorptive overlayer will not exhibit angle-dependent transmission as in the case of the thin-film dielectric layer overlay. Other suitable wavelength-limiting or otherwise spectrally selective layers or components can be employed as well.

Patterned substrates may be cut into smaller pieces and set into jewelry or watch housings or otherwise used as a part of jewelry articles.

Binary etching is generally lower cost and more reliable than multi-level etching, and therefore may be preferred as a method for manufacturing diffraction gratings disclosed herein. Mass production of attractive diffractive visual devices can also be accomplished by stamping or molding of plastics using a master formed by any of the fabrication methods mentioned above. Stamping or molding is especially useful for scribing visually attractive or security features on discs containing digital data (CD, DVD, HDVD, Blue-ray, etc.), credit cards, trade marks, logotypes, packaging, bills, documents, small product articles, and so forth. Acrylic and polycarbonate are attractive polymer materials for stamping or embossing. Nickel stamps (with flat surface or curved to be on cylindrical surface) derived from lithographically-scribed decorative diffractive articles using, for example, electroforming, can be employed to stamp patterns directly into metal substrates or polymer substrates. Metal structures can be also cast into a mold containing surface relief diffractive structures to produce metal decorative articles.

Three-Dimensional Appearance

Diffractive facets can be arranged on a flat substrate in a manner that creates the appearance of a three-dimensional faceted surface, similar to that of a faceted gemstone, when viewed by a human observer. Such an appearance can be achieved on a curved substrate as well.

Figure 15A:
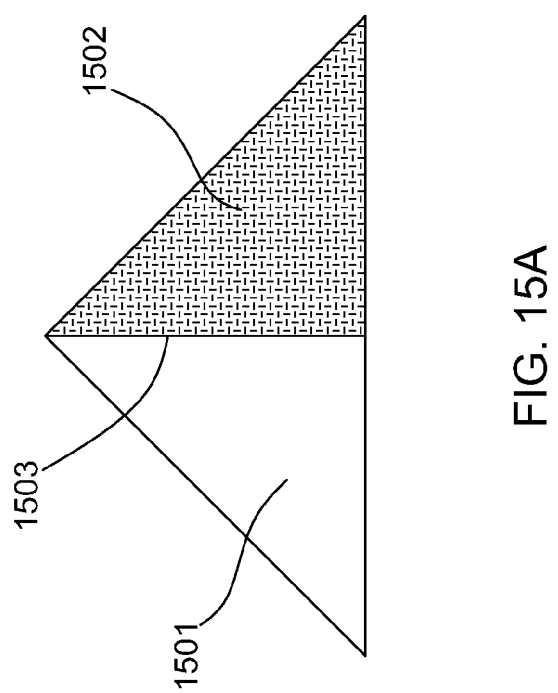
FIGS. 15A, 15B, and 16 illustrate schematically exemplary arrays of gratings arranged to appear three-dimensional.
Figure 15B:
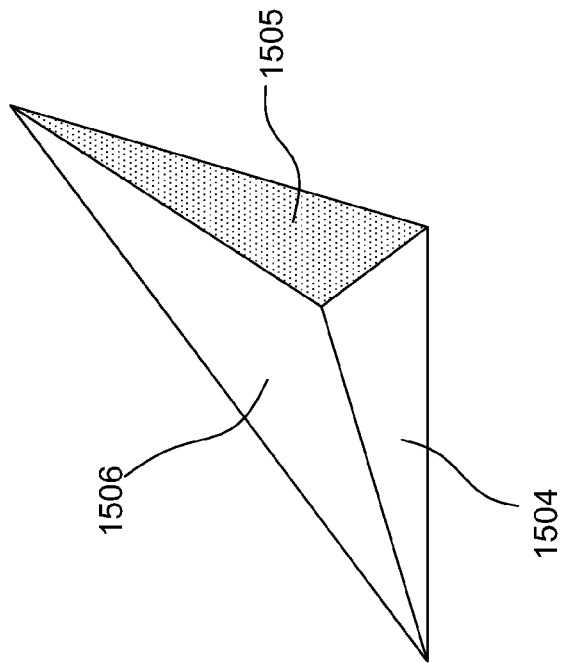

A first arrangement for creating a three-dimensional appearance is illustrated schematically in FIGS. 15A and 15B, in which an article is divided into multiple diffracting facets having differing diffracted intensities. In FIG. 15A, an article has two diffractive facets 1501 and 1502 having a common boundary region 1503. The diffractive structures of the facets 1501 and 1502 can differ with respect to one or more of: k-vector magnitude or direction; orientation of the diffractive contours; shape of the diffractive contours; or reflective amplitude of the diffractive contours. The various reflective amplitudes of the diffractive contours can be varied by partial writing and other methods described above and in various of the references mentioned herein. Because the diffractive properties of the facets differ (e.g., differing wavelengths or intensities), they look different from one another to an observer thereby creating the appearance of volume. In FIG. 15B, diffractive facet 1505 differs from facets 1504 or 1506 with respect to one or more of the properties listed above. The appearance of volume can be created for any number of facets of any suitable shapes. The interface or boundary regions between diffractive facets can be straight or curvilinear.

Figure 16:
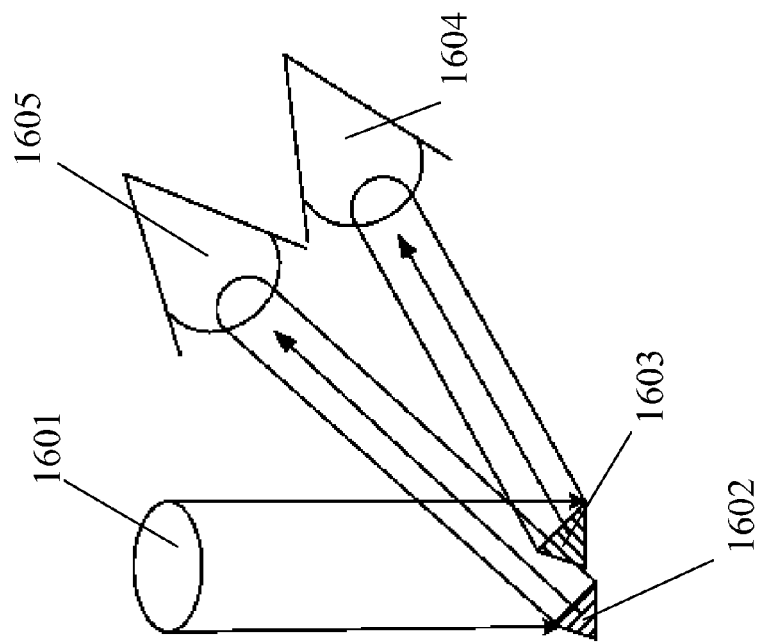

A second arrangement is illustrated schematically in FIG. 16 for creating a three-dimensional appearance of a substantially planar array of diffractive facets. Two slightly different copies 1602 and 1603 of a diffractive facet are arranged on an article with each copy configured to be visible to only a corresponding one of the observer's eyes 1605 or 1604, respectively. Given a suitable arrangement of the diffractive facets 1602 and 1603, the illumination direction 1601 or wavelength, and the position of the observer's eyes 1604 and 1605, the two images of the diffractive facets 1602 and 1603 can be fused in the user's visual field (functioning in much the same way as 3D movie glasses). The illumination source can be monochromatic or polychromatic and three-dimensional visual effect can be achieved for the same wavelength or differing wavelengths illuminating each of the two copies 1602 and 1603 of the diffractive facet. Said facets can partially or fully overlap as described above or in one or more of the various references mentioned herein. The slight difference between the replicas 1602 and 1603 can be introduced by differing spatial positions of the replicas, by differing size of the facets, by differing grating k-vector, orientation, or contour cross-section or shape, or by any suitable combination of those parameters.

Dynamically Pleasing Appearance

When jewelry items or decorative or ornamental items are observed, it is typical that the relative positions and orientations of the observer, the decorative item, and any light sources change. It generally follows that the light reflected or diffracted from the item will change as positions and orientations are changed. The effectiveness of a decorative item is enhanced if the light diffracted or reflected from it varies in a pleasing or coordinated way as the relative positions and orientations of item, observer, and light sources vary. The pleasing effect of a changing light pattern is in addition to the pleasing effect that might be derived from a particular static pattern.

Figure 11:
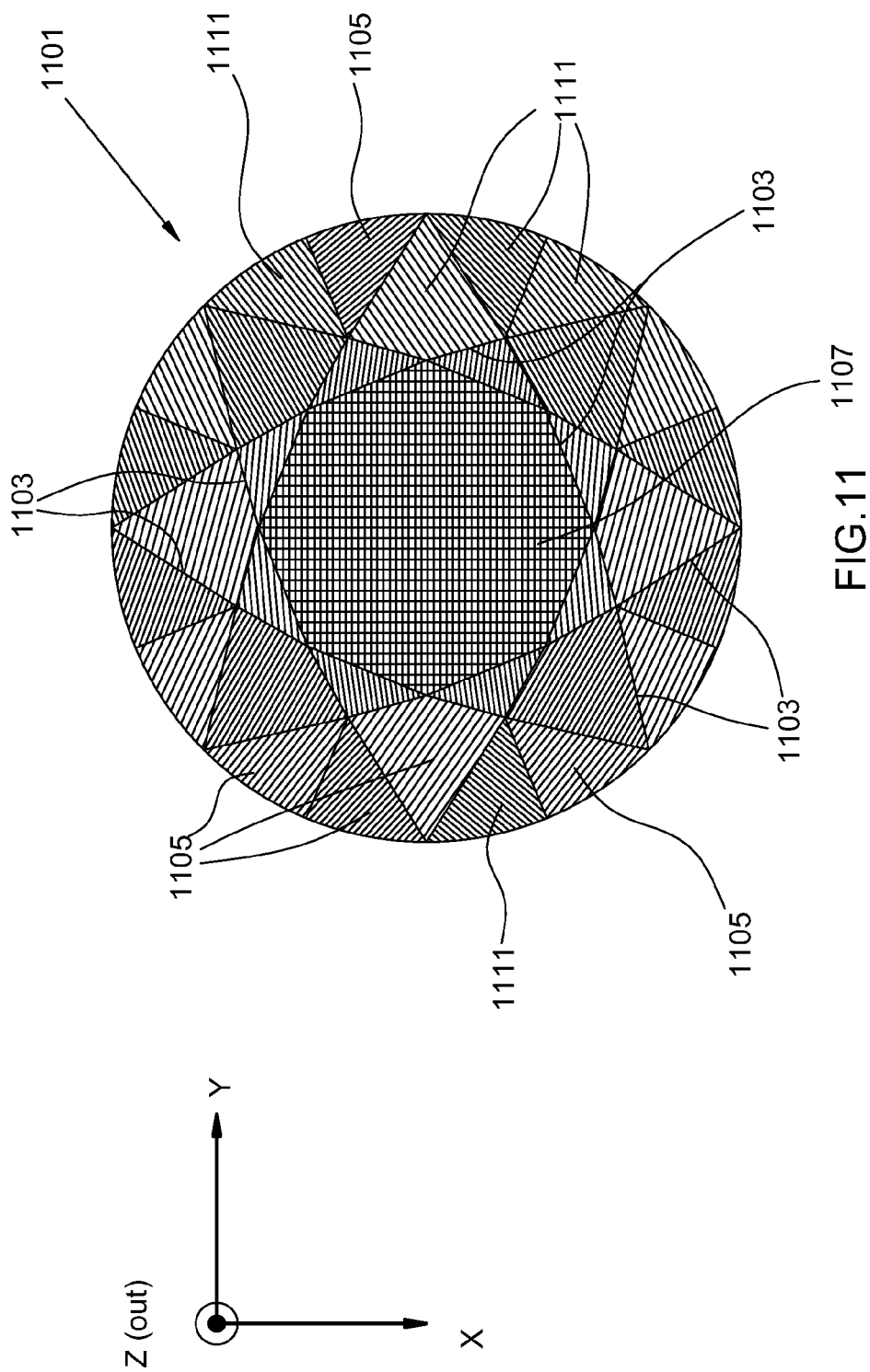
FIGS. 11 and 12 illustrate schematically an exemplary array of gratings arranged to resemble a faceted gemstone. The table in FIG. 13 lists grating parameters for the array of gratings shown in FIGS. 11 and 12.
Figure 12:
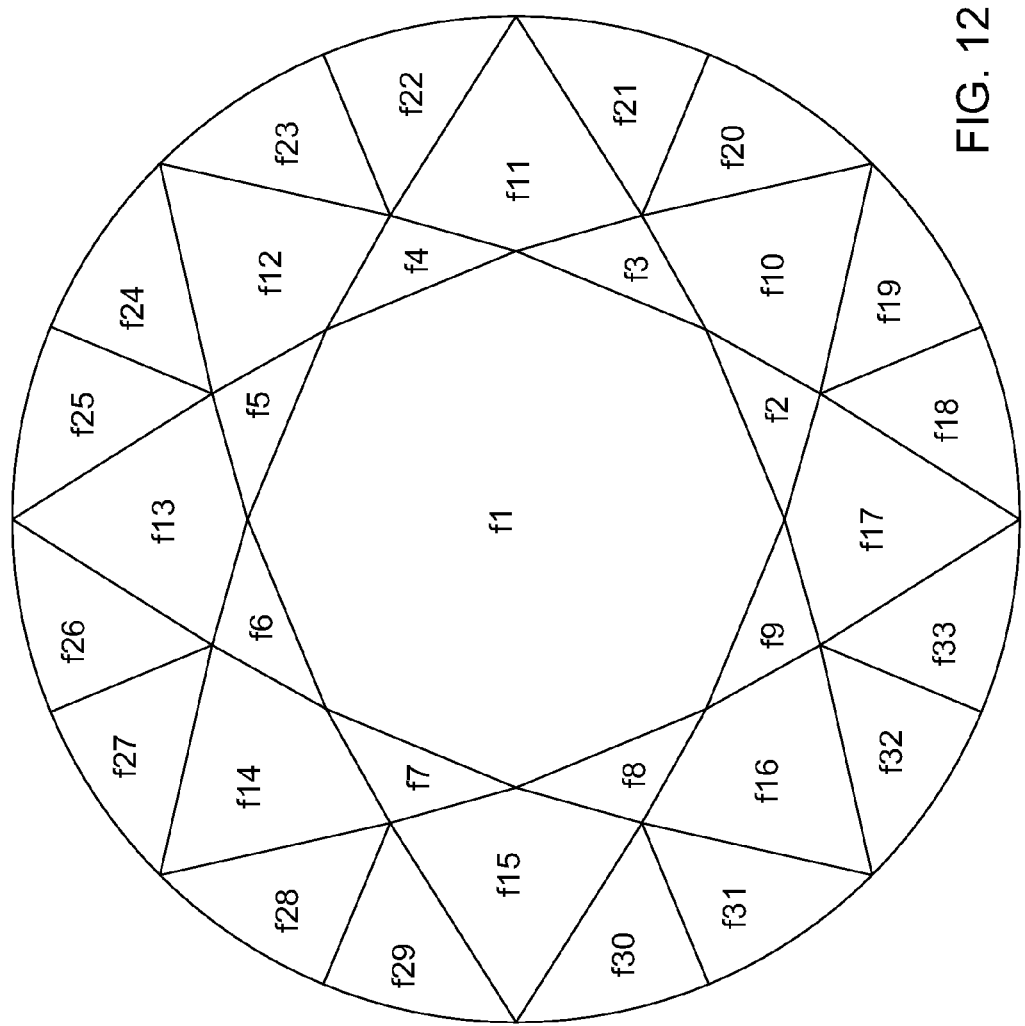

In FIG. 11 is illustrated a substantially planar set 1101 of diffractive facets, each comprising a diffraction grating that in this example has diffractive contours that are parallel, straight, uniformly spaced line segments bounded by facet boundaries 1103. The spacing of the diffractive contours is exaggerated in FIG. 11 for clarity of illustration. Two overlaid sets of diffractive contours are formed on the central facet 1107. In FIG. 12, the various facets are labeled with numerical designations. In accordance with standard nomenclature, the facets of FIG. 12 correspond to a two-dimensional projection of a three-dimensional brilliant-cut gemstone; facet f1 corresponds to the so-called "table" facet, facets f2-f9 correspond to so-called "star" facets, facets f10-f17 correspond to so-called "kite" facets, and facets f18-f33 correspond to so-called "upper girdle" facets. In FIG. 13, the magnitude (in inverse microns) of the grating k-vector for the diffractive contours of each diffractive facet is given along with the orientation (in degrees) of the grating k vector relative to the +x-axis (positive angles corresponding to rotation toward the negative y-direction). This particular arrangement of facets is designed for use as a diffractive ornament for a dangling earring. The x-axis shown in FIG. 11 is assumed to be vertical and the +y axis is horizontal and parallel to the direction the wearer would be looking while facing forward. In such a configuration, representative input light from a ceiling fixture may be seen as coming at a slant downward toward the earring. The item in FIG. 11 is designed assuming that input light is in the xz-plane, makes a 30° angle relative to the +x-direction (down), and a 60° angle relative to the −z-direction (with the +z-direction defined to be out of the page). The orientation and relative periods of the diffractive contours in each facet are schematically indicated and are seen to vary from facet to facet. The direction of output diffracted light can be determined using Eqs. 2a and 2b, and the data of FIG. 13. Note that $K_g$ is perpendicular to the contours in each facet.

This particular collection of facets has been optimized so that an observer passing the wearer of the diffractive earring item sees a colorful wash of light. If the observer is meeting the wearer face on, the earring facets to the rear (with one teaser facet toward the front) light up in colors. The illumination flows facet-to-facet toward the front of the item as the observer passes the wearer. As the observer is flush with the wearer the large central facet 1107 (containing a white set of horizontal diffractive contours) flashes brilliantly. As the observer continues moving back, the illuminated area of the earring moves toward the front of the earring except that a lone rear facet also lights up just as the observer passes farther to the back and the earring visibility fades. Facet subset 1105 contains some of the earliest facets to light up as the observer approaches the wearer from the front. Facet subset 1111 contains some of the last facets to light up as the observer moves to the rear (i.e. −y). The flow of illumination from facet-to-facet is enabled by the gradual variation in the orientation of the diffractive contours. In particular, facets intended to cast light farthest to the front (+y) have gratings whose k-vector is orientated farthest away from vertical (x direction). The use of varying contour orientation (equivalently, wavevector orientation) enables control of the observation angle at which a diffractive facet "lights up" of changes color.

Gradual spatial variation of contour orientation among the diffractive facets enables creation of dynamic patterned flow of illumination. Any desired patterned flow of illumination over any suitable arrangement of diffractive facets shall fall within the scope of the present disclosure or appended claims. Aside from the front to back pattern flow exhibited by the decorative article in FIG. 11, grating orientations can be arranged so that illuminated facets flow top to bottom or alternatively exhibit rotational trajectories. It is also possible to include side to side and rotational illumination flow, or any other desired pattern of spatial flow of the illumination.

Figure 14:
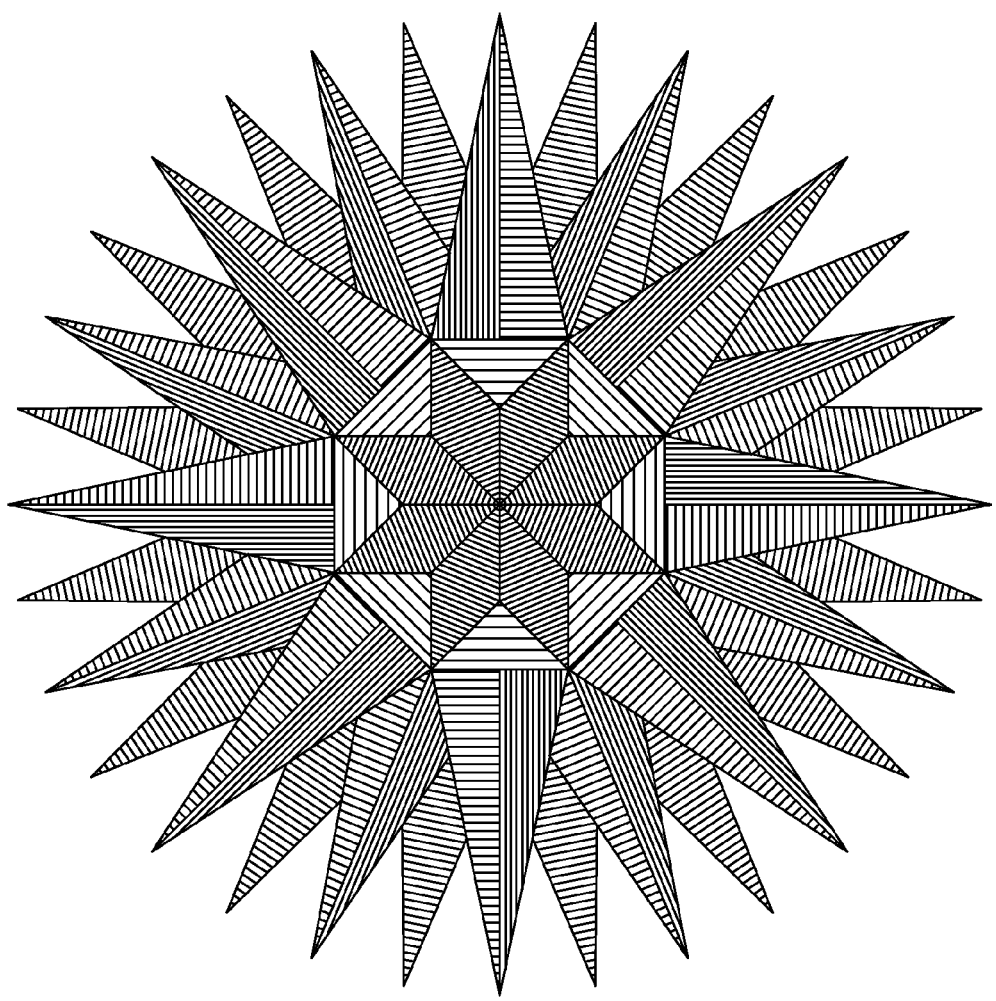
FIG. 14 illustrates schematically an exemplary array of gratings arranged to resemble a mariner's compass.

In FIG. 14, a decorative diffractive structure having a geometry based on the mariner's compass theme. The diffractive contours are schematically shown within each facet. The distribution of diffractive contour orientations shown provides for the perception of a rotating cross-like pattern of illuminated facets as one rotates the item or passes by the stationary item. This item is designed to have a high degree of angular symmetry so that its observational behavior appears similar regardless of orientation (unlike the brilliant center facet design of FIG. 11). A symmetric design may be chosen for decorative items to be placed for example in rings or other jewelry items that might be viewed from a wide range of directions.

Facet Boundaries

The diffractive facets of a jewelry, decorative, or ornamental article can be arranged to have an attractive appearance simply on the basis of their geometry, particularly if the arrangements are highly intricate or symmetric. In such cases, it may be desirable to arrange the facet boundary regions to scatter light, so as to be visible from many directions regardless of diffraction by the diffractive contours of the adjacent facets. In other words, it can be visually pleasing for the facet boundaries always to be visible to an observer moving relative to the item while the facets themselves blink on or off or change colors. This effect can be achieved during fabrication by arranging the diffractive contours of adjacent facets to overlap slightly (on the order of 1 to 20 μm), or to introduce a region of irregularly spaced etched dots, dashes, or other convenient shape along the facet boundaries. The size of and spacing between etched shapes is typically arranged on a size scale of about 0.2 to 5 μm. In another implementation, visible facet boundaries can be formed by diffractive contours arranged specifically for that purpose along a narrow strip at the boundary region. Those diffractive contours would typically vary substantially in contour spacing or orientation so as to provide a wide angle of visibility. Alternatively, facet boundaries can be formed that simply reflect incident light by specular reflection.

While only a few facet shapes have been disclosed here, a wide range of polygons, circles, stars, or other general curved shapes may be employed and collectively arranged so as to comprise an overall pleasing structure.

The exemplary embodiments have included diffraction gratings that are formed on or applied to planar surfaces. The present disclosure and appended claims are also intended to encompass diffraction gratings formed on or applied to articles having non-planar surfaces, i.e., three-dimensional surfaces. A contoured gemstone is just one example of such an article. For example, a decorative article having a non-planar surface can be made by first forming a planar diffractive structure on a flexible membrane and then adhering that membrane to the non-planar article surface. Alternatively, one or more planar diffractive structures can be incorporated into a mold at various positions with varying inclination from which a decorative article can then be made, e.g., by injection molding. These and myriad other examples shall fall within the scope of the present disclosure or appended claims.

While the exemplary embodiments have been described primarily in terms of reflective diffraction gratings, any of the embodiments and variations and equivalents thereof can also be implemented as transmission gratings, or as gratings that operate in both reflection and transmission. All such variations shall fall within the scope of the present disclosure or appended claims.

While the exemplary embodiments have been described primarily interacting with white light, and typically ambient light, various of the embodiments can nevertheless produce visually pleasing displays when illuminated by substantially monochromatic light, polychromatic light (comprising multiple discrete wavelength components), or light exhibiting a continuous, broad spectral range (but not necessarily over the entire visible range, and hence not white). Such illumination scenarios shall fall within the scope of the present disclosure and the appended claims.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

What is claimed is:

1. An article comprising (i) a substantially flat substrate bearing a set of substantially flat, substantially coplanar diffraction gratings, and (ii) a jewelry mounting attached to the substrate, wherein:
    (a) the gratings of the set are arranged so as to occupy corresponding areas of the substrate that are arranged to correspond to a two-dimensional projection of multiple, non-coplanar facets of a three-dimensional faceted gemstone;
    (b) each grating of the set differs from one or more other gratings of the set with respect to a corresponding grating wavevector direction so that each grating of the set differs from at least one other grating of the set with respect to a corresponding direction of dispersion of spectrally dispersed output directions of a diffracted portion of input light incident on the gratings along a given input direction; and
    (c) the grating wavevectors are spatially distributed among the corresponding gratings of the set so as to form two or more subsets of three or more gratings of the set along which subsets the corresponding grating wavevector direction of each grating of the subset varies monotonically with position of that grating along a given dimension of the substrate.

2. The article of claim 1 wherein the gratings of each subset are sequentially adjacent.

3. The article of claim 1 wherein the monotonic variation of grating wavevector direction of at least one grating subset is opposite the monotonic variation of grating wavevector direction of at least one other grating subset.

4. The article of claim 1 wherein the areas of the substrate are arranged to correspond to a two-dimensional projection of a table facet and multiple crown facets of a three-dimensional brilliant-cut gemstone.

5. The article of claim 4 wherein at least one of the subsets comprises gratings occupying areas corresponding to, in order, a first upper girdle facet, a first kite facet, second and third upper girdle facets, a second kite facet, fourth and fifth upper girdle facets, a third kite facet, and a sixth upper girdle facet.

6. The article of claim 4 wherein at least one of the subsets comprises gratings occupying areas corresponding to, in order, a first upper girdle facet, a first kite facet, the table facet, a second kite facet, and a second upper girdle facet.

7. The article of claim 6 wherein the first kite facet is opposite the second kite facet across the table facet.

8. The article of claim 4 wherein at least one of the subsets comprises gratings occupying areas corresponding to, in order, a first upper girdle facet, a first star facet, the table facet, a second star facet, and a second upper girdle facet.

9. The article of claim 8 wherein the first star facet is opposite the second star facet across the table facet.

10. The article of claim 1 wherein the spatial distribution of the grating wavevectors among the corresponding gratings results in a predetermined spatial and spectral pattern of perceived illumination of the corresponding areas of the substrate as a viewing position moves parallel to the given dimension of the substrate, which perceived illumination pattern includes sequential perceived illumination of the gratings of each grating subset and thereby simulates an appearance of a three-dimensional gemstone moving with respect to an illumination direction or a viewing direction.

11. The article of claim 1 wherein at least one grating of the set comprises a corresponding set of sub-gratings, wherein:
   each sub-grating of the set is arranged to diffract at least a portion of light incident along the given input direction in a corresponding output direction and in a corresponding sub-grating output spectrum;
   each sub-grating of the set is sized and positioned relative to the others so that, when illuminated along the given input direction and viewed along the corresponding output direction from an intended viewing distance, a perceived image of each of the sub-gratings of the set substantially overlaps that of one or more adjacent sub-gratings of the set;
   each sub-grating of the set differs from at least one adjacent sub-grating of the set with respect to wavevector direction or magnitude, so that each sub-grating of the set differs from at least one adjacent sub-grating of the set with respect to the corresponding sub-grating output spectra; and
   the corresponding sub-grating output spectra of the overlapped perceived images result in an overall perceived color of the overlapped perceived images.

12. The article of claim 11 wherein the sub-gratings of the set are arranged so that the perceived color of the overlapped perceived images is substantially similar for the entire set of sub-gratings.

13. The article of claim 11 wherein the sub-gratings of the set are arranged so that the perceived color of the overlapped perceived images varies among differing portions of the set of sub-gratings.

14. The article of claim 11 wherein the set of sub-grating output spectra comprises a red output spectrum, a green output spectrum, and a blue output spectrum, and the perceived color of the overlapped perceived images is substantially white.

15. The article of claim 1 wherein one or more gratings of the set are arranged so as to focus the diffracted portion of the input light.

16. The article of claim 1 further comprising at least one spectrally selective layer over the set of diffraction gratings.

17. A method for fabricating the article of claim 1, the method comprising
   (i) forming the diffraction gratings on the corresponding areas of the substrate, and
   (ii) attaching the substrate to the jewelry mounting.

* * * * *